US010438242B1

(12) United States Patent
Carr et al.

(10) Patent No.: US 10,438,242 B1
(45) Date of Patent: Oct. 8, 2019

(54) CONVERGED WEB-IDENTITY AND MOBILE DEVICE BASED SHOPPING

(71) Applicant: Amazon Technologies, Inc., Seattle, WA (US)

(72) Inventors: Michael Carr, Bellevue, WA (US); Bhavnish H. Lathia, Redmond, WA (US); James Hsiaosung Chuang, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 410 days.

(21) Appl. No.: 14/726,380

(22) Filed: May 29, 2015

Related U.S. Application Data

(62) Division of application No. 12/894,323, filed on Sep. 30, 2010, now Pat. No. 9,058,604.

(51) Int. Cl.
*G06Q 30/02* (2012.01)
*H04W 4/02* (2018.01)

(52) U.S. Cl.
CPC ..... *G06Q 30/0267* (2013.01); *G06Q 30/0255* (2013.01); *G06Q 30/0259* (2013.01); *G06Q 30/0261* (2013.01); *G06Q 30/0269* (2013.01); *H04W 4/02* (2013.01)

(58) Field of Classification Search
CPC ....................................... G06Q 30/0207–0277
USPC ............................................. 705/14.1–14.73
See application file for complete search history.

(56) References Cited

U.S. PATENT DOCUMENTS 5,294,472 A 3/1994 Arnold et al.
5,914,472 A 6/1999 Foladare et al.
6,108,650 A 8/2000 Musk et al.
6,173,269 B1 1/2001 Solokl et al.
6,327,348 B1 12/2001 Walker et al.
(Continued)

FOREIGN PATENT DOCUMENTS

CN 101689268 3/2010
CN 101919274 12/2010
(Continued)

OTHER PUBLICATIONS

U.S. Appl. No. 12/820,816, filed Jun. 22, 2010, Harsha Ramalingam, "Mobile Device Security".
(Continued)

*Primary Examiner* — Sam Refai
(74) *Attorney, Agent, or Firm* — Kilpatrick Townsend & Stockton LLP

(57) ABSTRACT

Techniques for providing information to a user of a mobile device based on an online or web-identity of the user and a geolocation of the mobile device are described herein. The user may be notified when a nearby merchant has a good or service for sale that matches a good or service in a list, such as a wish list, associated with the web-identity of the user. The users may also be provided access to a coupon within an electronic document when a mobile device storing the electronic document is located at a particular merchant. This convergence of geographical location of the user, as determined by the geolocation of his or her mobile device, with his or her web-identity can bring the online and off-line worlds closer together to provide relevant information for the user and improved marketing opportunities for merchants.

20 Claims, 11 Drawing Sheets

(56) References Cited

U.S. PATENT DOCUMENTS

| | | |
|---|---|---|
| 6,343,279 B1 | 1/2002 | Bissonette et al. |
| 6,505,046 B1 | 1/2003 | Baker |
| 6,597,770 B2 | 7/2003 | Walker et al. |
| 6,738,749 B1 | 5/2004 | Chasko |
| 6,756,879 B2 | 6/2004 | Shuster |
| 7,392,534 B2 | 6/2008 | Lu et al. |
| 7,434,723 B1 | 10/2008 | White et al. |
| 7,657,489 B2 | 2/2010 | Stambaugh |
| 7,725,390 B2 | 5/2010 | Plant |
| 7,739,197 B2 | 6/2010 | Jambunathan et al. |
| 7,788,281 B2 | 8/2010 | Cole et al. |
| 7,813,717 B2 | 10/2010 | Huotari et al. |
| 7,840,222 B2 | 11/2010 | Hampel et al. |
| 7,853,786 B1 | 12/2010 | Fultz et al. |
| 7,873,708 B2 | 1/2011 | Durand et al. |
| 7,899,742 B2 | 3/2011 | Benkert et al. |
| 7,900,847 B2 | 3/2011 | Lindahl et al. |
| 8,050,991 B2 | 11/2011 | Popovic et al. |
| 8,099,109 B2 | 1/2012 | Altman et al. |
| 8,116,731 B2 | 2/2012 | Buhrmann et al. |
| 8,135,624 B1 | 3/2012 | Ramalingam et al. |
| 8,140,403 B2 | 3/2012 | Ramalingam et al. |
| 8,213,898 B2 | 7/2012 | Choti et al. |
| 8,255,698 B2 | 8/2012 | Li et al. |
| 8,326,767 B1 | 12/2012 | Ramanujan et al. |
| 8,447,651 B1* | 5/2013 | Scholl et al. ............. 705/14.54 |
| 8,521,131 B1 | 8/2013 | Ramalingam et al. |
| 8,606,322 B2 | 12/2013 | Sabol |
| 8,744,488 B2 | 6/2014 | Cousins et al. |
| 8,849,310 B2 | 9/2014 | Fan et al. |
| 8,863,307 B2 | 10/2014 | Sorek |
| 9,058,604 B2 | 6/2015 | Carr et al. |
| 9,107,064 B1 | 8/2015 | Ramalingam et al. |
| 2001/0025257 A1 | 9/2001 | Sato |
| 2001/0051911 A1 | 12/2001 | Marks et al. |
| 2002/0046116 A1 | 4/2002 | Hohle et al. |
| 2002/0065713 A1 | 5/2002 | Awada et al. |
| 2002/0077876 A1 | 6/2002 | O'Meara et al. |
| 2002/0091568 A1 | 7/2002 | Kraft et al. |
| 2002/0123938 A1 | 9/2002 | Yu et al. |
| 2002/0133467 A1 | 9/2002 | Hobson et al. |
| 2002/0143638 A1 | 10/2002 | August et al. |
| 2003/0159066 A1 | 8/2003 | Staw et al. |
| 2003/0208386 A1 | 11/2003 | Brondrup |
| 2003/0208684 A1 | 11/2003 | Camacho et al. |
| 2003/0212609 A1 | 11/2003 | Blair et al. |
| 2003/0220835 A1 | 11/2003 | Barnes, Jr. |
| 2004/0002897 A1 | 1/2004 | Vishik |
| 2004/0019563 A1 | 1/2004 | Sines et al. |
| 2004/0039694 A1 | 2/2004 | Dunn et al. |
| 2004/0056101 A1 | 3/2004 | Barkan et al. |
| 2004/0093620 A1 | 5/2004 | Iino et al. |
| 2005/0004840 A1 | 1/2005 | Wanninger |
| 2005/0021773 A1 | 1/2005 | Shiga et al. |
| 2005/0177442 A1 | 8/2005 | Sullivan et al. |
| 2005/0221843 A1 | 10/2005 | Friedman et al. |
| 2005/0228719 A1 | 10/2005 | Roberts et al. |
| 2005/0234771 A1 | 10/2005 | Register et al. |
| 2005/0240472 A1 | 10/2005 | Postrel |
| 2005/0267812 A1* | 12/2005 | Jensen et al. ................. 705/26 |
| 2005/0288719 A1 | 12/2005 | Zhang et al. |
| 2006/0047576 A1 | 3/2006 | Aaltonen et al. |
| 2006/0111955 A1 | 5/2006 | Winter et al. |
| 2006/0235795 A1 | 10/2006 | Johnson et al. |
| 2006/0235796 A1 | 10/2006 | Johnson et al. |
| 2006/0242017 A1 | 10/2006 | Libes et al. |
| 2007/0084913 A1 | 4/2007 | Weston |
| 2007/0088610 A1 | 4/2007 | Chen |
| 2007/0118426 A1 | 5/2007 | Barnes, Jr. |
| 2007/0136140 A1 | 6/2007 | Smith, Jr. |
| 2007/0291710 A1 | 12/2007 | Fadell |
| 2008/0004949 A1 | 1/2008 | Flake et al. |
| 2008/0005104 A1* | 1/2008 | Flake et al. ................. 707/6 |
| 2008/0010121 A1 | 1/2008 | McIntosh |
| 2008/0027810 A1 | 1/2008 | Lerner et al. |
| 2008/0033637 A1 | 2/2008 | Kuhlman et al. |
| 2008/0040233 A1 | 2/2008 | Wildman et al. |
| 2008/0040274 A1 | 2/2008 | Uzo |
| 2008/0086767 A1 | 4/2008 | Kulkarni et al. |
| 2008/0140522 A1 | 6/2008 | Tutone |
| 2008/0154654 A1 | 6/2008 | Niessen et al. |
| 2008/0154765 A1 | 6/2008 | Wolfe |
| 2008/0154847 A1 | 6/2008 | Chellapilla et al. |
| 2008/0167991 A1 | 7/2008 | Carlson et al. |
| 2008/0183576 A1 | 7/2008 | Kim et al. |
| 2008/0183675 A1 | 7/2008 | Schwarz et al. |
| 2008/0201226 A1 | 8/2008 | Carlson et al. |
| 2008/0208739 A1 | 8/2008 | Phillips |
| 2008/0215475 A1 | 9/2008 | Ramer et al. |
| 2008/0221997 A1 | 9/2008 | Wolfe |
| 2008/0228600 A1 | 9/2008 | Treyz et al. |
| 2008/0262928 A1* | 10/2008 | Michaelis ............... G06Q 30/02 705/14.26 |
| 2008/0268868 A1 | 10/2008 | Maitland |
| 2008/0275768 A1 | 11/2008 | Berman et al. |
| 2008/0281677 A1 | 11/2008 | Toms et al. |
| 2008/0281702 A1 | 11/2008 | Kirkwood |
| 2008/0318559 A1 | 12/2008 | Porco |
| 2009/0005973 A1* | 1/2009 | Salo ................... G01C 21/3682 701/533 |
| 2009/0006203 A1 | 1/2009 | Fordyce, III et al. |
| 2009/0024477 A1 | 1/2009 | Kramer et al. |
| 2009/0024700 A1 | 1/2009 | Garg et al. |
| 2009/0030779 A1 | 1/2009 | Tollinger et al. |
| 2009/0061884 A1 | 3/2009 | Rajan et al. |
| 2009/0076896 A1 | 3/2009 | DeWitt et al. |
| 2009/0076925 A1 | 3/2009 | DeWitt et al. |
| 2009/0125380 A1 | 5/2009 | Otto et al. |
| 2009/0125396 A1 | 5/2009 | Otto et al. |
| 2009/0132417 A1 | 5/2009 | Scipioni et al. |
| 2009/0138302 A1 | 5/2009 | Breznik et al. |
| 2009/0143966 A1 | 6/2009 | Jacobson et al. |
| 2009/0150218 A1 | 6/2009 | Brunner et al. |
| 2009/0152343 A1 | 6/2009 | Carter et al. |
| 2009/0157547 A1 | 6/2009 | Ruckart |
| 2009/0187463 A1 | 7/2009 | DaCosta |
| 2009/0187466 A1 | 7/2009 | Carter et al. |
| 2009/0187488 A1 | 7/2009 | Shamilian |
| 2009/0187492 A1 | 7/2009 | Hammad et al. |
| 2009/0198607 A1 | 8/2009 | Badger et al. |
| 2009/0199107 A1 | 8/2009 | Lewis et al. |
| 2009/0216646 A1 | 8/2009 | Seven et al. |
| 2009/0222346 A1 | 9/2009 | Greene et al. |
| 2009/0228325 A1 | 9/2009 | Simmons et al. |
| 2009/0240582 A1 | 9/2009 | Sheldon-Neal et al. |
| 2009/0240622 A1 | 9/2009 | Zandonadi |
| 2009/0249497 A1 | 10/2009 | Fitzgerald et al. |
| 2009/0253408 A1 | 10/2009 | Fitzgerald et al. |
| 2009/0254930 A1 | 10/2009 | Lo et al. |
| 2009/0271275 A1 | 10/2009 | Regmi et al. |
| 2009/0281945 A1 | 11/2009 | Shakkarwar |
| 2009/0287558 A1 | 11/2009 | Seth et al. |
| 2009/0292642 A1 | 11/2009 | Han |
| 2009/0299857 A1 | 12/2009 | Brubaker |
| 2009/0313129 A1 | 12/2009 | Rothschild |
| 2009/0327135 A1 | 12/2009 | Nguyen et al. |
| 2009/0327151 A1 | 12/2009 | Carlson et al. |
| 2010/0004997 A1 | 1/2010 | Mehta et al. |
| 2010/0006641 A1 | 1/2010 | Boutcher et al. |
| 2010/0006642 A1 | 1/2010 | Boutcher et al. |
| 2010/0030592 A1 | 2/2010 | Evans et al. |
| 2010/0030646 A1 | 2/2010 | Riise et al. |
| 2010/0030651 A1 | 2/2010 | Matotek et al. |
| 2010/0032339 A1 | 2/2010 | Hasegawa et al. |
| 2010/0041419 A1 | 2/2010 | Svendsen et al. |
| 2010/0042421 A1 | 2/2010 | Bai et al. |
| 2010/0049615 A1 | 2/2010 | Rose et al. |
| 2010/0057530 A1 | 3/2010 | Parivash et al. |
| 2010/0063891 A1 | 3/2010 | Townsend et al. |
| 2010/0070334 A1 | 3/2010 | Monteverde |
| 2010/0070365 A1 | 3/2010 | Siotia et al. |
| 2010/0076829 A1 | 3/2010 | Bishop |
| 2010/0076849 A1 | 3/2010 | Bishop |
| 2010/0077036 A1 | 3/2010 | DeLuca et al. |

(56) References Cited

U.S. PATENT DOCUMENTS

| | | |
|---|---|---|
| 2010/0082420 A1 | 4/2010 | Trifiletti et al. |
| 2010/0082445 A1 | 4/2010 | Hodge et al. |
| 2010/0088188 A1 | 4/2010 | Kumar et al. |
| 2010/0100454 A1 | 4/2010 | Sines et al. |
| 2010/0106611 A1 | 4/2010 | Paulsen et al. |
| 2010/0114775 A1 | 5/2010 | Griffin |
| 2010/0121717 A1 | 5/2010 | Chen |
| 2010/0138294 A1 | 6/2010 | Bussmann et al. |
| 2010/0138344 A1 | 6/2010 | Wong et al. |
| 2010/0145723 A1 | 6/2010 | Hudson et al. |
| 2010/0145778 A1 | 6/2010 | Fordyce, III et al. |
| 2010/0146607 A1 | 6/2010 | Piepenbrink et al. |
| 2010/0156933 A1 | 6/2010 | Jones et al. |
| 2010/0169179 A1 | 7/2010 | Ramer et al. |
| 2010/0185504 A1 | 7/2010 | Rajan et al. |
| 2010/0190510 A1 | 7/2010 | Maranhas et al. |
| 2010/0191551 A1 | 7/2010 | Drance et al. |
| 2010/0191578 A1 | 7/2010 | Tran et al. |
| 2010/0192230 A1 | 7/2010 | Steeves et al. |
| 2010/0205167 A1 | 8/2010 | Tunstall-Pedoe et al. |
| 2010/0217525 A1 | 8/2010 | King et al. |
| 2010/0223184 A1 | 9/2010 | Perlman |
| 2010/0241495 A1 | 9/2010 | Maniyar et al. |
| 2010/0241496 A1 | 9/2010 | Gupta et al. |
| 2010/0250368 A1 | 9/2010 | Porco |
| 2010/0257054 A1* | 10/2010 | Martin .................. G06Q 30/02 705/14.46 |
| 2010/0260388 A1 | 10/2010 | Garrett et al. |
| 2010/0262449 A1 | 10/2010 | Monteforte et al. |
| 2010/0274655 A1 | 10/2010 | Postrel |
| 2010/0293065 A1 | 11/2010 | Brody et al. |
| 2010/0306099 A1 | 12/2010 | Hirson et al. |
| 2010/0312630 A1 | 12/2010 | Krutchik et al. |
| 2010/0312645 A1 | 12/2010 | Niejadlik et al. |
| 2010/0312646 A1 | 12/2010 | Gupta et al. |
| 2010/0323716 A1 | 12/2010 | Jaffri |
| 2010/0324977 A1 | 12/2010 | Dragt |
| 2010/0332339 A1 | 12/2010 | Patel et al. |
| 2011/0010238 A1 | 1/2011 | Postrel |
| 2011/0015987 A1 | 1/2011 | Chakraborty et al. |
| 2011/0022424 A1 | 1/2011 | VonDerheide |
| 2011/0022483 A1 | 1/2011 | Hammad |
| 2011/0022517 A1 | 1/2011 | Hammad |
| 2011/0029403 A1 | 2/2011 | Xu |
| 2011/0053559 A1 | 3/2011 | Klein |
| 2011/0055005 A1 | 3/2011 | Lang |
| 2011/0057027 A1 | 3/2011 | Grossman et al. |
| 2011/0060640 A1 | 3/2011 | Thompson et al. |
| 2011/0065419 A1 | 3/2011 | Book et al. |
| 2011/0082735 A1 | 4/2011 | Kannan et al. |
| 2011/0087430 A1 | 4/2011 | Boss et al. |
| 2011/0093318 A1 | 4/2011 | Guday et al. |
| 2011/0106613 A1 | 5/2011 | Felt et al. |
| 2011/0112892 A1 | 5/2011 | Tarantino |
| 2011/0131627 A1 | 6/2011 | Abendroth et al. |
| 2011/0137804 A1 | 6/2011 | Peterson |
| 2011/0140841 A1 | 6/2011 | Bona et al. |
| 2011/0184793 A1 | 7/2011 | Bohannon et al. |
| 2011/0189981 A1 | 8/2011 | Faith et al. |
| 2011/0191152 A1 | 8/2011 | Schwartz |
| 2011/0191161 A1 | 8/2011 | Dai |
| 2011/0191237 A1 | 8/2011 | Faith et al. |
| 2011/0202416 A1 | 8/2011 | Buer et al. |
| 2011/0238474 A1 | 9/2011 | Carr et al. |
| 2011/0238476 A1 | 9/2011 | Carr et al. |
| 2011/0238514 A1 | 9/2011 | Ramalingam et al. |
| 2011/0238517 A1 | 9/2011 | Ramalingam et al. |
| 2011/0270618 A1 | 11/2011 | Banerjee et al. |
| 2011/0289004 A1 | 11/2011 | Prakash et al. |
| 2011/0302016 A1 | 12/2011 | Haddad |
| 2012/0010931 A1 | 1/2012 | Mehra et al. |
| 2012/0010938 A1 | 1/2012 | Standley et al. |
| 2012/0185317 A1 | 7/2012 | Wong |
| 2012/0259722 A1 | 10/2012 | Mikurak |
| 2012/0323703 A1 | 12/2012 | Hillier |
| 2014/0300540 A1 | 10/2014 | Beadle et al. |

FOREIGN PATENT DOCUMENTS

| | | |
|---|---|---|
| JP | 2000134147 | 5/2000 |
| JP | 2001222593 A | 8/2001 |
| JP | 2001357337 A | 12/2001 |
| JP | 2002099971 | 4/2002 |
| JP | 2002175354 A | 6/2002 |
| JP | 2002288502 A | 10/2002 |
| JP | 2003022481 A | 1/2003 |
| JP | 2003090730 | 3/2003 |
| JP | 2004264986 | 9/2004 |
| JP | 2004341684 A | 12/2004 |
| JP | 2006164189 | 6/2006 |
| JP | 2007208444 | 8/2007 |
| JP | 2007522564 | 8/2007 |
| JP | 2008022395 | 1/2008 |
| JP | 2008199221 | 8/2008 |
| JP | 2009020036 | 1/2009 |
| JP | 2009205684 | 9/2009 |
| JP | 2009224868 | 10/2009 |
| JP | 2009538093 | 10/2009 |
| JP | 2009282618 | 12/2009 |
| JP | 2009283989 | 12/2009 |
| JP | 2011188256 | 9/2011 |
| JP | 2012510681 | 5/2012 |
| JP | 2012529085 | 11/2012 |
| KR | 1020070105106 | 10/2007 |
| KR | 20090080000 | 7/2009 |
| KR | 20090104068 | 10/2009 |
| WO | 2008067543 A2 | 6/2008 |
| WO | 2010015995 | 2/2010 |
| WO | WO2010065235 | 6/2010 |
| WO | WO2010138891 | 12/2010 |

OTHER PUBLICATIONS

U.S. Appl. No. 12/976,533, filed Dec. 22, 2010, Harsha Ramalingam, "Mobile Payments Using Point-of-sale Infrastructure".

U.S. Appl. No. 13/027,913, filed Feb. 15, 2011, Harsha Ramalingam, et al., "User Profile and Geolocation for Efficient Transactions".

U.S. Appl. No. 13/052,930, filed Mar. 21, 2011, Hart et al., "Advertisement Service".

U.S. Appl. No. 13/371,038, filed Feb. 10, 2012, Harsha Ramalingam et al., "User Profile and Geolocation for Efficient Transactions".

Alqerem et al., "Location Dependent Transaction for Mobile Environment", International Conference on Information and Communication Technologies: From Theory to Applications, Piscataway, NJ, 2006, 2 pages.

The Canadian Office Action dated Aug. 29, 2014 for Canadian patent application No. 2794085, a counterpart foreign application of U.S. Appl. No. 12/820,672, 3 pages.

The Canadian Office Action dated Apr. 7, 2015 for Canadian patent application No. , a counterpart foreign application of U.S. Appl. No. 13/052,930, 5 pages.

Office Action from the Chinese Patent Office for Chinese patent application No. 201180015579.3, dated Mar. 10, 2015,11 pages.

Collins, "Smartphones to be used as Hotel Room Keys", Telegraph Media Group Limited, May 25, 2010, Retrieved on Jun. 2, 2010 at <<http://www.telegraph.co.uk/travel/hotels/7762522/Smartphones-to-be-used-as-hotel-room-keys.html>> pp. 1-2.

Definition: Purchase, retrieved on Mar. 31, 2014 at <<dictionary.reference.com/browse/purchase?s=t>>, World English Dictionary, 2009, 2 pages.

Deleon, "Holiday Inn to Trial Mobile-as-room-key Program Next Month", TechCrunch, May 25, 2010, Retrieved on Jun. 2, 2010 at <<http://www.mobilecrunch.com/2010/05/25/holiday-inn-to-trial-mobile-as-room-key-program-next-month/>> 1 pg.

Dictionary.com, "Broadcast", retrived at <<http://dictionary.reference.com/browse/broadcast>> on Feb. 6, 2012, 4 pages.

The Extended European Search Report dated Oct. 31, 2014 for European Patent Application No. 12760316.5, 7 pages.

(56) References Cited

OTHER PUBLICATIONS

The Extended European Search Report dated Feb. 26, 2014 for European patent application No. 11759940.7, 11 pages.
Final Office Action for U.S. Appl. No. 12/820,949, dated Jan. 6, 2014, Harsha Ramalingam, "Transaction Tracking and Incentives", 22 pages.
Final Office Action for U.S. Appl. No. 12/820,854, dated Oct. 22, 2013, Harsha Ramalingam, "Location-Based Marketing to Mobile Devices", 21 pages.
Final Office Action for U.S. Appl. No. 12/820,705, dated Dec. 5, 2013, Harsha Ramalingam, "Transaction Completion Based on Geolocation Arrival", 14 pages.
Final Office Action for U.S. Appl. No. 12/820,913, dated Apr. 24, 2015, Harsha Ramalingam, "Transaction Bootstrapping to Create Relationships", 12 pages.
Translated Japanese Office Action dated Mar. 31, 2015 for Japanese patent application No. 2015-047434, a counterpart foreign application of U.S. Appl. No. 12/820,672, 9 pages.
Translated Japanese Office Action dated Dec. 10, 2013 for Japanese patent application No. 2013-500205, a counterpart foreign application of U.S. Pat. No. 8,140,403, 9 pages.
Translated Japanese Office Action dated Jul. 1, 2014 for Japanese patent application No. 2014-094659, a counterpart foreign application of U.S. Pat. No. 8,140,403, 4 pages.
Translated Japanese Office Action dated Jul. 29, 2014 for Japanese patent application No. 2013-553675, a counterpart foreign application of U.S. Appl. No. 13/052,930, 9 pages.
Translated Office Action from the Korean Patent Office for Korean patent application No. 10-2014-7035474, dated Jan. 28, 2015, 11 pages.
Translated Korean Office Action dated Apr. 24, 2015 for Korean patent application No. 10-2012-7024786, a counterpart foreign application of U.S. Appl. No. 12/820,672, 9 pages.
Translated Korean Office Action dated Oct. 17, 2014 for Korean patent application No. 10-2012-7024786, a counterpart foreign application of U.S. Appl. No. 12/820,672, 11 pages.
"MGM Grand, MacroView Labs—Mobile App Developers for iPhone, Android, Blackberries", retrieved on Jan. 13, 2011 at <<http://www.macroviewlabs.com/mgmgrand>>, 5 pages.
Non-Final Office Action for U.S. Appl. No. 13/052,930, dated Jan. 2, 2013, Gregory M. Hart et al., "Advertisement Service", 19 pages.
Office Action for U.S. Appl. No. 13/111,920, dated Oct. 2, 2013, Andrew J. Doane, "Location-Based Mobile Advertising", 28 pages.
Office Action for U.S. Appl. No. 12/820,854, dated Nov. 5, 2014, Harsha Ramalingam, "Location-Based Marketing to Mobile Devices", 23 pages.
Office action for U.S. Appl. No. 12/820,949, dated Nov. 9, 2012, Ramalingam et al, "Transaction Tracking and Incentives", 11 pages.
Office Action for U.S. Appl. No. 12/894,287, dated Dec. 4, 2014, Michael Carr, "Location-based Coupons and Mobile Devices", 24 pages.
Office action for U.S. Appl. No. 12/894,323, dated Dec. 12, 2012, Carr et al., "Converged Web-identity and Mobile Device Based Shopping", 9 pages.
Office Action for U.S. Appl. No. 13/052,930, dated Dec. 16, 2013, Gregory M. Hart, "Advertisement Service", 28 pages.
Office action for U.S. Appl. No. 12/820,743, dated Dec. 27, 2013, Ramalingam et al., "Hierarchical Device Relationships for Geolocation-Based Transactions", 26 pages.
Non-Final Office Action for U.S. Appl. No. 12/820,816, dated Dec. 31, 2012, Harsha Ramalingham et al., "Mobile Device Security", 10 pages.
Office Action for U.S. Appl. No. 12/820,913, dated Dec. 4, 2013, Harsha Ramalingam, "Transaction Bootstrapping to Create Relationships", 24 pages.
Non-Final Office Action for U.S. Appl. No. 12/894,287, dated Dec. 5, 2012, Michael Carr et al., "Location-based Coupons and Mobile Devices", 8 pages.

Non-Final Office Action for U.S. Appl. No. 12/820,705, dated Feb. 27, 2012, Harsha Ramalingam et al., "Transaction Completion Based on Geolocation Arrival", 15 pages.
Non-Final Office Aciotn for U.S. Appl. No. 12/820,743, dated Feb. 27, 2012, Harsha Ramalingam et al, "Hierarchical Device Relationships for Geolocation-Based Transactions", 18 pages.
Office action for U.S. Appl. No. 12/820,913, dated Feb. 8, 2013, Ramalingam et al., "Transaction Bootstrapping to Create Relationships", 19 pages.
Office Action from U.S. Appl. No. 12/894,287, dated Mar. 27, 2014, Michael Carr, "Location-based Coupons and Mobile Devices", 17 pages.
Office action for U.S. Appl. No. 12/820,854, dated Apr. 10, 2013, Ramalingam et al., "Location-Based Marketing to Mobile Devices", 22 pages.
Final Office Action for U.S. Appl. No. 12/820,743, dated Apr. 10, 2014, Harsha Ramalingam, "Hierarchical Device Relationships for Geolocation-Based Transactions", 24 pages.
Office action for U.S. Appl. No. 13/468,714, dated Apr. 11, 2013, Ramalingam, "Mobile Payments Using Point-of-sale Infrastructure", 35 pages.
Office action for U.S. Appl. No. 12/976,533, dated Apr. 12, 2013, Ramalingam, "Mobile Payments Using Point-of-sale Infrastructure", 44 pages.
Office Action for U.S. Appl. No. 12/820,705, dated Apr. 17, 2015, Harsha Ramalingam, "Transaction Completion Based on Geolocation Arrival", 23 pages.
Office Action for U.S. Appl. No. 12/820,705, dated Apr. 2, 2014, Harsha Ramalingam, "Transaction Completion Based on Geolocation Arrival", 11 pages.
Office action for U.S. Appl. No. 12/820,743, dated Apr. 3, 2015, Ramalingam et al., "Hierarchical Device Relationships for Geolocation-Based Transactions", 21 pages.
U.S. Appl. No. 13/052,930 , "Final Office Action", dated Feb. 2, 2016, 35 pages.
U.S. Appl. No. 13/111,920 , "Final Office Action", dated Feb. 12, 2016, 34 pages.
U.S. Appl. No. 13/725,466 , "Final Office Action", dated Mar. 16, 2016, 28 pages.
U.S. Appl. No. 14/821,337 , "Notice of Allowance", dated Mar. 11, 2016, 9 pages.
CN201280008527.8 , "Office Action", dated Dec. 24, 2015, 16 pages.
U.S. Appl. No. 12/820,672 , "Non-Final Office Action", dated Mar. 24, 2011, 24 pages.
U.S. Appl. No. 12/820,672 , "Notice of Allowance", dated Nov. 7, 2011, 10 pages.
U.S. Appl. No. 12/820,672 , "Restriction Requirement", dated Jan. 27, 2011, 9 pages.
U.S. Appl. No. 12/820,705 , "Non-Final Office Action", dated Feb. 9, 2016, 13 pages.
U.S. Appl. No. 12/820,705 , "Restriction Requirement", dated Feb. 11, 2015, 7 pages.
U.S. Appl. No. 12/820,705 , "Restriction Requirement", dated Nov. 22, 2011, 8 pages.
U.S. Appl. No. 12/820,743 , "Advisory Action", dated Oct. 7, 2015.
U.S. Appl. No. 12/820,743 , "Non-Final Office Action", dated Feb. 1, 2016, 9 pages.
U.S. Appl. No. 12/820,743 , "Restriction Requirement", dated Jan. 7, 2015.
U.S. Appl. No. 12/820,743 , "Restriction Requirement", dated Nov. 18, 2011.
U.S. Appl. No. 12/820,913 , "Advisory Action", dated May 8, 2013, 3 pages.
U.S. Appl. No. 12/820,913 , "Final Office Action", dated Mar. 4, 2016, 42 pages.
U.S. Appl. No. 12/820,913 , "Non-Final Office Action", dated Sep. 9, 2015, 30 pages.
U.S. Appl. No. 12/820,949 , "Advisory Action", dated Apr. 16, 2014, 3 pages.
U.S. Appl. No. 12/820,949 , "Restriction Requirement", dated Jul. 31, 2012.

(56) References Cited

OTHER PUBLICATIONS

U.S. Appl. No. 12/820,949, U.S. Patent Application, filed Jun. 22, 2010, Titled: Transaction Tracking and Incentives.
U.S. Appl. No. 12/894,287, "Advisory Action", dated Dec. 19, 2013, 3 pages.
U.S. Appl. No. 12/894,287, "Final Office Action", dated Feb. 22, 2016, 29 pages.
U.S. Appl. No. 12/894,287, "Restriction Requirement", dated Sep. 25, 2012, 7 pages.
U.S. Appl. No. 12/894,323, "Notice of Allowance", dated Feb. 2, 2015, 14 pages.
U.S. Appl. No. 12/894,323, "Restriction Requirement", dated Sep. 25, 2012, 7 pages.
U.S. Appl. No. 12/976,533, "Non-Final Office Action", dated Sep. 23, 2015, 39 pages.
U.S. Appl. No. 13/027,913, "Non-Final Office Action", dated Mar. 29, 2011, 25 pages.
U.S. Appl. No. 13/027,913, "Notice of Allowance", dated Nov. 7, 2011, 21 pages.
U.S. Appl. No. 13/371,038, "Notice of Allowance", dated Oct. 11, 2012, 9 pages.
U.S. Appl. No. 13/371,038, "Restriction Requirement", dated Apr. 6, 2012, 7 pages.
U.S. Appl. No. 13/468,714, "Final Office Action," dated Feb. 25, 2016, 14 pages.
U.S. Appl. No. 13/725,466, "Non-Final Office Action", dated Oct. 5, 2015, 20 pages.
U.S. Appl. No. 13/973,870, "Corrected Notice of Allowability", dated May 20, 2015, 7 pages.
U.S. Appl. No. 13/973,870, "Notice of Allowance", dated Apr. 3, 2015, 11 pages.
CA2,794,085, "Office Action", dated Aug. 27, 2015, 4 pages.
CN201180015579.3, "Office Action", dated Oct. 16, 2015, 13 pages.
JP2015-047434, "Notice of Allowance", dated Dec. 15, 2015, 6 pages.
KR10-2014-7035474, "Office Action", dated Oct. 29, 2015, 3 pages.
KR10-2015-7033998, "Office Action", dated Jan. 6, 2016, 6 pages.
Final Office Action for U.S. Appl. No. 12/820,913, dated Apr. 9, 2014, Harsha Ramalingam, "Transaction Bootstrapping to Create Relationships", 21 pages.
Final Office Action for U.S. Appl. No. 12/894,287, dated Apr. 9, 2015, Michael Carr, "Location-based Coupons and Mobile Devices", 24 pages.
Office Action for U.S. Appl. No. 12/820,854, dated May 9, 2014, Harsha Ramalingam, "Location-Based Marketing to Mobile Devices", 25 pages.
Office action for U.S. Appl. No. 12/820,949, dated Jun. 20, 2013, Ramalingam et al, "Transaction Tracking and Incentives", 20 pages.
Office action for U.S. Appl. No. 13/111,920, dated Jun. 20, 2014, Doane et al., "Location-Based Mobile Advertising", 31 pages.
Final Office Action for U.S. Appl. No. 12/820,743, dated Jun. 21, 2012, Harsha Ramalingam et al, "Hierarchical Device Relationships for Geolocation-Based Transactions", 24 pages.
Office action for U.S. Appl. No. 12/894,323, dated Jun. 24, 2013, Carr et al., "Converged Web-identity and Mobile Device Based Shopping", 12 pages.
Final Office Action for U.S. Appl. No. 12/820,854, dated Jun. 3, 2015, Harsha Ramalingam, "Location-Based Marketing to Mobile Devices", 11 pages.
Office action for U.S. Appl. No. 13/052,930, dated Jul. 1, 2014, Hart et al., "Advertisement Service", 29 pages.
Office Action for U.S. Appl. No. 13/052,930, dated Jul. 10, 2015, Gregory M. Hart, "Advertisement Service", 30 pages.
Office Action for U.S. Appl. No. 13/111,920, dated Jul. 10, 2015, Andrew J. Doane, "Location-Based Mobile Advertising", 29 pages.
Office action for U.S. Appl. No. 12/820,705, dated Jul. 12, 2013, Ramalingam et al, "Transaction Completion Based on Geolocation Arrival", 16 pages.
Office action for U.S. Appl. No. 12/894,287, dated Jul. 16, 2013, Carr et al., "Location-based Coupons and Mobile Devices", 18 pages.
Non-Final Office Action for U.S. Appl. No. 13/371,038, dated Jul. 23, 2012, Harsha Ramalingam et al., 8 pages.
Final Office Action for U.S. Appl. No. 12/820,705, dated Jul. 25, 2012, Harsha Ramalingam et al., "Transaction Completion Based on Geolocation Arrival", 16 pages.
Non-Final Office Action for U.S. Appl. No. 12/820,854, dated Jul. 27, 2012, Harsha Ramalingam et al., "Location-Based Marketing to Mobile Devices", 16 pages.
Office action for U.S. Appl. No. 12/820,743, dated Jul. 29, 2015, Ramalingam et al., "Hierarchical Device Relationships for Geolocation-Based Transactions", 9 pages.
Non-Final Office Action for U.S. Appl. No. 12/820,913, dated Jul. 31, 2012, Harsha Ramalingam et al. "Transaction Bootstrapping to Create Relationships", 14 pages.
Office action for U.S. Appl. No. 13/052,930, dated Jul. 8, 2013, Hart et al., "Advertisement Service", 20 pages.
Non-Final Office Action for U.S. Appl. No. 13/468,714, dated Aug. 16, 2012, Harsha Ramalingam, "Mobile Payments Using Point-of-sale Infrastructure", 29 pages.
Non-Final Office Action for U.S. Appl. No. 12/976,533, dated Aug. 16, 2012, Harsha Ramalingam, "Mobile Payments Using Point-of-sale Infrastructure", 38 pages.
Office action for U.S. Appl. No. 12/820,705 dated Aug. 19, 2015, Ramalingam et al., "Transaction Completion Based on Geolocation Arrival", 15 pages.
Office action for U.S. Appl. No. 13/468,714 dated Aug. 31, 2015, Ramlingham, "Mobile Payments Using Point-of-sale Infrastructure", 35 pages.
Office action for U.S. Appl. No. 12/820,913, dated Sep. 11, 2014, Ramalingam et al., "Transaction Bootstrapping to Create Relationships", 15 pages.
Office action for U.S. Appl. No. 12/894,323, dated Sep. 11, 2014, Carr et al, "Converged Web-identity and Mobile Device Based Shopping", 14 pages.
Office action for U.S. Appl. No. 12/820,705, dated Sep. 2, 2014, Ramalingam et al., "Transaction Completion Based on Geolocation Arrival", 12 pages.
Office action for U.S. Appl. No. 12/894,287 dated Sep. 3, 2015, Carr et al., "Location-based Coupons and Mobile Devices", x pages.
The PCT Search Report dated May 12, 2011 for PCT Application No. PCT/US11/28825.
The PCT Search Report for PCT application No. PCT/US12/29798, dated Jul. 5, 2012, 7 pages.
"Placecast Raises $3 Million for Location-Based Mobile Marketing Technology", The Good NET Guide, Retrieved on Mar. 25, 2010 at <<http://thegoodnetguide.com/03/placecast-raises-3-million-for-location-based-mobile-marketing-technology/>>, 1 pg.
Prabhu, "Transaction Processing in Mobile Database System", University of Missouri—Kansas City, 2006. vol. 67/12-B of Dissertation Abstracts International, 1 page.
Starbucks Card Mobile App, "Using Your Starbucks Card is Now Even Faster and Easier With the Starbucks Card Mobile App", Retrieved on Apr. 22, 2010 at <<http://www.starbucks.com/coffeehouse/mobile-apps/starbucks-card-mobile>>, pp. 1-2.
WebWire, "BooksOnBoard Adds Google Checkout, Offers Discount on Google Checkout Purchases", Jun. 11, 2008, retrived from Google News Apr. 6, 2012, pp. #1-pp. #2.
U.S. Appl. No. 12/820,854, "Non-Final Office Action", dated May 24, 2016, 19 pages.
U.S. Appl. No. 12/976,533, "Final Office Action", dated Jun. 3, 2016, 51 pages.
CA2,830,268, "Office Action", dated Mar. 30, 2016, 5 pages.
U.S. Appl. No. 12/820,705, "Advisory Action", dated Sep. 27, 2016, 3 pages.
U.S. Appl. No. 13/111,920, "Non-Final Office Action", dated Sep. 14, 2016, 34 pages.
CA2,794,085, "Office Action", dated Sep. 15, 2016, 3 pages.
CN201180015579.3, "Decision to Grant", dated Sep. 1, 2016, 2 pages.

(56) References Cited

OTHER PUBLICATIONS

U.S. Appl. No. 12/820,705, "Final Office Action", dated Jun. 17, 2016, 15 pages.
U.S. Appl. No. 12/820,743, "Final Office Action", dated Jun. 29, 2016, 14 pages.
U.S. Appl. No. 12/820,854, "Final Office Action", dated Aug. 31, 2016, 21 pages.
U.S. Appl. No. 12/820,913, "Non-Final Office Action", dated Jul. 22, 2016, 19 pages.
U.S. Appl. No. 12/894,287, "Non-Final Office Action", dated Jul. 29, 2016, 38 pages.
U.S. Appl. No. 14/726,380, "Non-Final Office Action", dated Aug. 9, 2016, 45 pages.
CN201280008527.8, "Office Action", dated Aug. 4, 2016, 15 pages.
EP11759940.7, "Office Action", dated Aug. 17, 2016, 6 pages.
EP12760316.5, "Office Action", dated Aug. 9, 2016, 6 pages.
KR10-2015-07033998, "Office Action", dated Jul. 26, 2016, 7 pages.
U.S. Appl. No. 12/820,705, "Notice of Allowance", dated Dec. 16, 2016, 7 pages.
U.S. Appl. No. 12/820,913, "Examiner's Answer to Appeal Brief", dated Feb. 24, 2017, 54 pages.
U.S. Appl. No. 12/894,287, "Final Office Action", dated Feb. 3, 2017, 24 pages.
U.S. Appl. No. 13/468,714, "Notice of Allowance", dated Feb. 28, 2017, 9 pages.
CA2,830,268, "Office Action", dated Feb. 1, 2017, 14 pages.
CA2,921,085, "Office Action", dated Feb. 9, 2017, 3 pages.
CN201280008527.8, "Office Action", dated Jan. 24, 2017, 16 pages.
U.S. Appl. No. 12/820,743, "Notice of Allowance", dated Apr. 12, 2017, 9 pages.
U.S. Appl. No. 12/820,949, "Notice of Allowance", dated May 23, 2017, 22 pages.
U.S. Appl. No. 13/111,920, "Final Office Action", dated Apr. 14, 2017, 36 pages.
U.S. Appl. No. 13/725,466, "Non-Final Office Action", dated Mar. 20, 2017, 29 pages.
KR10-2017-7002603, "Office Action", dated Mar. 7, 2017, 6 pages.
U.S. Appl. No. 13/052,930, "Final Office Action", dated Jul. 18, 2017, 39 pages.
U.S. Appl. No. 13/725,466, "Final Office Action", dated Aug. 4, 2017, 22 pages.
CA2,794,085, "Office Action", dated Aug. 14, 2017, 3 pages.
CA2,830,268, "Office Action", dated Sep. 20, 2017, 7 pages.
CN201280008527.8, "Office Action", dated Aug. 22, 2017, 9 pages.
EP17158535.9, "Extended European Search Report", dated Jul. 11, 2017, 7 pages.

\* cited by examiner

CONVERGED WEB-IDENTITY AND MOBILE DEVICE BASED SHOPPING

CROSS REFERENCE TO RELATED APPLICATIONS

This application is a divisional of co-pending, commonly owned U.S. patent application Ser. No. 12/894,323, filed Sep. 30, 2010, entitled "CONVERGED WEB-IDENTITY AND MOBILE DEVICE BASED SHOPPING," which is related to U.S. Provisional Application Nos. 61/316,527 filed on Mar. 23, 2010 and 61/351,743 filed on Jun. 4, 2010, and the entirety of each related application is incorporated by reference herein.

BACKGROUND

The widespread use of mobile phones and the increasing sophistication of smart phones have created societies in which personal, mobile computing power has become nearly ubiquitous. Content for mobile computing devices has typically flowed from technology initially used with desktop computers. Some aspects of mobile computing devices, such as a small form factor with limited display capabilities and a lack of full-size keyboards, hinder adoption of content originally designed for desktop computers. Other aspects, such as the mobility itself, provide unique opportunities to use mobile computing devices in ways very different than desktop computers. Development of content that recognizes the limitations while taking full advantage of the unique aspects of mobile computing devices is an active and maturing field.

Although some merchants have both online or web-based stores as well as brick-and-mortar stores, the online and brick-and-mortar worlds are largely separate. However, mobile computing devices allow someone to be both "online" and at a brick-and-mortar merchant simultaneously. For some transactions such as purchasing goods or services, consumers may be primarily concerned about price, convenience, and quality rather than the online or off-line format of the transaction. Additionally, advertising and marketing opportunities that cover both the brick-and-mortar and the online worlds may present additional ways for merchants to reach potential consumers. Accordingly, the convergence of an online presence and a real-world location can facilitate transactions and enhance advertising to the benefit of both consumers and merchants.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
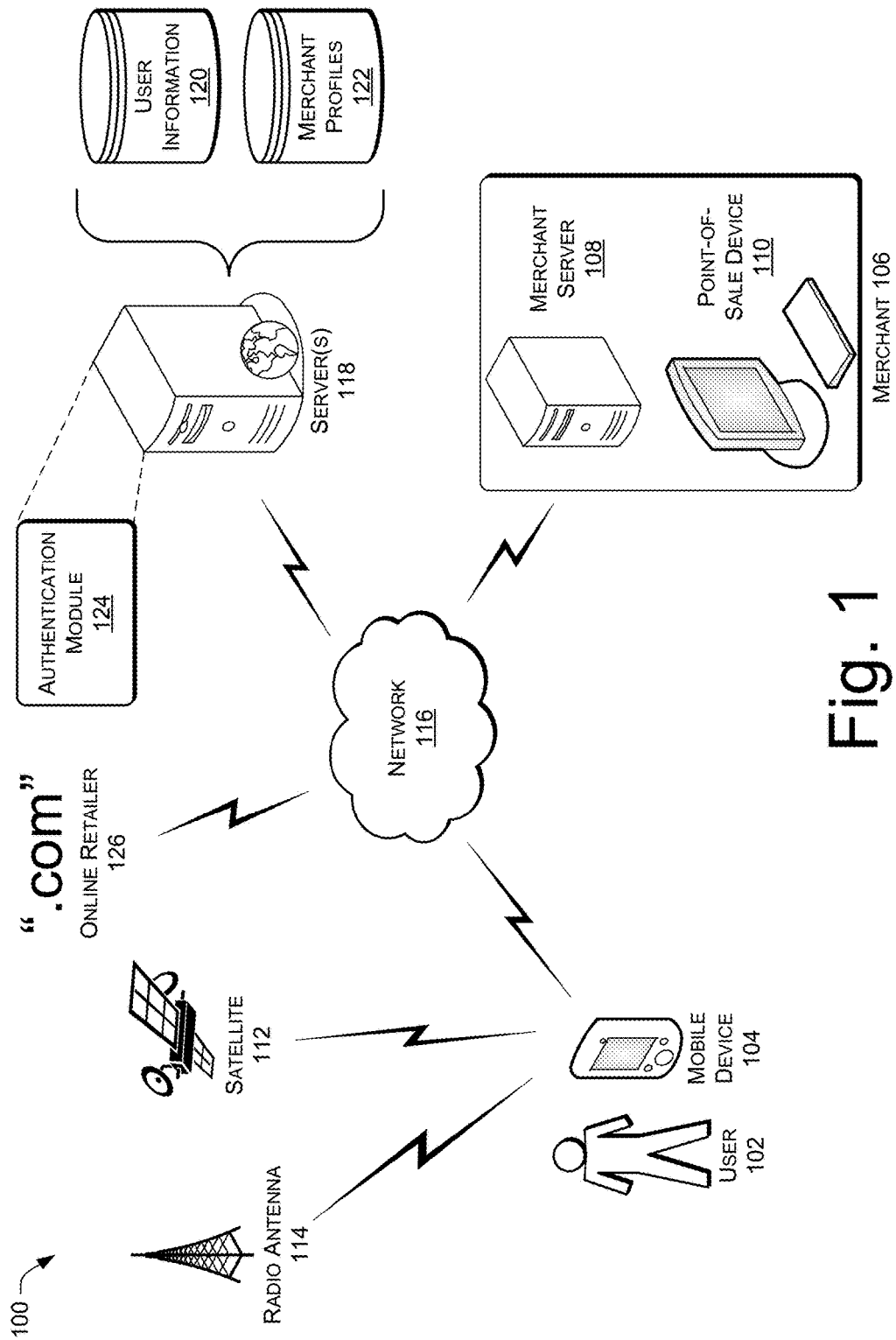
FIG. 1 shows an illustrative architecture in which a user of a mobile device, a merchant located at a specific geolocation, and an online retailer may interact.

Mobile devices that provide wireless connection to the Internet (or other network) allow access to what may be called the "mobile web." The mobile web may be accessed from a coffee shop, a park, an airport, a shopping mall, or any other location where there is a sufficient wireless signal. With the mobile web, access to the Internet is no longer limited to offices, libraries, dorm rooms, and such places with a computer and an Internet connection. Many of the mobile devices that provide access to the mobile web are also equipped with a Global Positioning System (GPS) or other type of location sensing technology. Therefore, the Internet accessed by a mobile device could be thought of "existing" at the specific geographic location or "geolocation" of the mobile device. Thus, content from the Internet (or from another source such as a local storage device) presented to a user of a mobile device may differ depending on a geolocation of the mobile device.

This disclosure is directed to, in part, providing information to a user of a mobile device. For instance, if a good or service that the user may wish to purchase is for sale at a nearby merchant, that information may be provided to the user. One source of information about the user carrying the mobile device may be that user's web-identity which could contains such information as past purchases made from online retail websites, a wish list of items selected by the user, web pages the user has frequently or recently viewed, and the like. The web-identity may suggest what types of good and/or services the user desires and the geolocation of the mobile device may suggest convenient, nearby brick-and-mortar merchants. This combination of web-identity and physical location may also be used to suggest that the user purchase a good or service from a nearby merchant instead of an online retailer.

This disclosure is directed to, in further part, providing additional access to content based on geolocation. The content may be a promotion, such as a coupon, that provides the user with a financial incentive to go to (along with his or her mobile device) a particular geolocation. The geolocation may be a merchant that wishes to bring potential customers into the store by making, for example, a coupon available only inside the store. The coupon may be related to the goods and/or services sold by the merchant or related to goods and/or services sold by an online retailer. The content may also be provided after the user goes to multiple locations (e.g., several merchants) and logs in or checks in with a server or other computer at each of those locations.

A merchant may include any human or legal person that is a seller of goods or services at a specific geolocation that engages in transactions with customers. An online retailer may also include any human or legal person that is a seller of goods or services, but an online retailer engages in remote transactions with customers over an electronic communications network (for example, but not limited to, website-based retailers). A single company may have both a web presence and brick-and-mortar stores so that aspects of the same company can be classified as an online retailer and as a merchant.

The described techniques may be implemented in a number of ways and in a number of contexts. Example implementations and context are provided with reference to the following figures, as described below in more detail. It is to be appreciated, however, that the following implementations and contexts illustrative of many possible implementations and contexts Illustrative Environment and System Architecture FIG. 1 shows an illustrative architecture 100 in which a representative user 102 employs a mobile device 104 to interact with a merchant 106. The merchant 106 may comprise a merchant server 108 and a point-of-sale device 110 (e.g., a "cash register"). In some implementations, there may be one merchant server 108 for several point-of-sale devices 110. The merchant server 108 may also include merchant applications that manage interactions between the merchant 106 and the mobile device 104. The merchant applications may include applications that regulate point-of-sale transactions, online transactions, the provisioning of promotions, coupons, information, and the like. The merchant server 108 may also store customer information about past or potential future customers. In some implementations, the customer information may comprise information such as personal information about the customer, customer preferences, and the like.

The mobile device 104 may be implemented as any number of mobile devices, including but not limited to a mobile phone, a personal digital assistant (PDA), a laptop computer, a net book, an eBook reader, a personal media player (PMP), a portable gaming system, an automobile navigation system, and so forth. The device 104 is location aware, or is able to provide information to another entity (e.g., a server computer) to allow the other entity to determine a location of the device 104. A location on the surface of the earth, or a "geolocation," may be provided to the device by a satellite 112 such as a GPS satellite. Alternatively, wireless signals such as from a radio antenna 114 may be used to determine a geolocation of the device 104 relative to a known position of the radio antenna 114. Other technologies and methods for determining geolocation are also envisioned within the scope of this disclosure such as, for example, calculating geolocation based on a network access point (e.g., Wi-Fi hotspot) or from a locator signal broadcast from a known location, such as at the merchant 106.

The device 104 and the merchant 106 may connect to a network 116. The network 116 may include any one or combination of multiple different types of networks, such as cable networks, local area networks, personal area networks, wide area networks, the Internet, wireless networks, ad hoc networks, mesh networks, and/or the like. In some implementations the satellite 112 and/or the radio antenna 114 may provide network connectivity to the mobile device 104 as well as provide geolocation. For example, the radio antenna 114 may provide network access to the mobile device 104 according to the International Mobile Telecommunications-2000 standards ("3G network") or the International Mobile Telecommunications Advanced standards ("4G network"). Other implementations may include one source of geolocation data such as the satellite 112 and a separate source of network connectivity such as a Wi-Fi hotspot. The merchant 106 may connect to the network 116 through the merchant server 108 using any suitable mechanism such as a wired or wireless connection.

A one or more servers 118 may also be connected to the network 116 and configured to manage interaction between the mobile device 104 and the merchant 106. The server(s) 118 may house or otherwise have a connection to multiple data stores including user information 120, merchant profiles 122, and/or other data stores. Generally, the user information 120 contains information about the user 102 associated with the mobile device 104. The user information 120 enables efficient and personalized interaction between the user 102 and the merchant 106. The merchant profiles 122 generally contain information about one or more merchants including the merchant 106 with which the user 102 is interacting. One type of interaction between the merchant 106 and the user 102 is purchasing a good and/or service from the merchant 106 when the user 102 is at the merchant location. Information about which goods and/or services the user is be interested in purchasing may be contained in the user information 120. Both of the data stores will be discussed in greater detail below.

The server(s) 118 may also comprise an authentication module 124 that compares login information from the mobile device 104 and/or the merchant 106 to confirm that the correct user information 120, merchant profiles 122, and other information is correlated with the correct entity (e.g., user 102 and/or point-of-sale device 110). The authentication module 124 will be discussed in greater detail below.

One or more online retailers 126 may also be connected to the network 116. The online retailer(s) 126 may offer goods and/or services for sale over the network 116 without having a brick-and-mortar merchant location. Each of the mobile device 104, the merchant 106, the server(s) 118 and the online retailer(s) 126 may communicate with one another over the network 116. One company or store may have both an online retailer 126 and one or more merchants 106 located at multiple geolocations.

Illustrative Mobile Device

Figure 2:
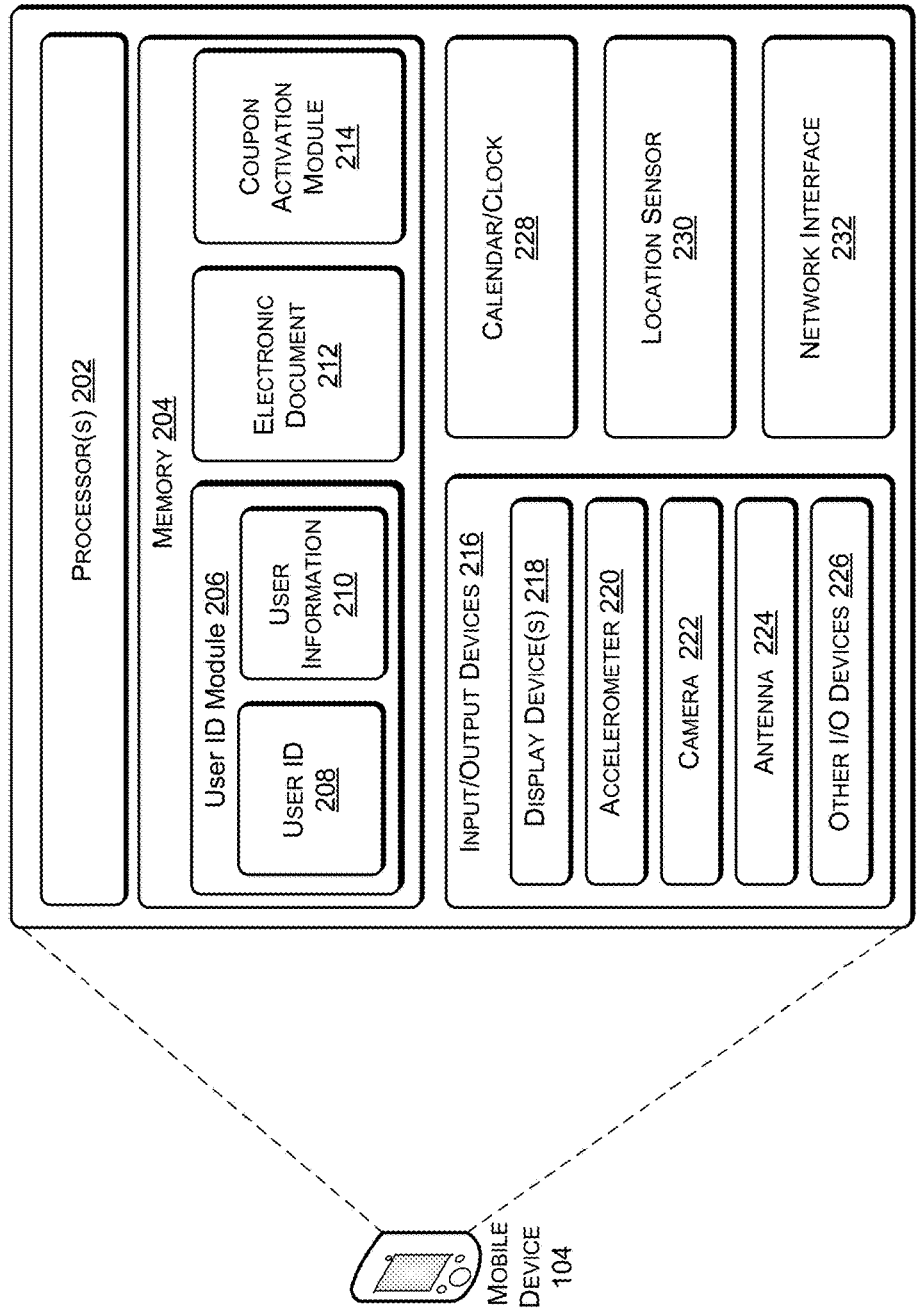
FIG. 2 shows the mobile device from FIG. 1 in greater detail.

FIG. 2 is a schematic representation of the mobile device 104 of FIG. 1. The mobile device 104 includes one or more processors 202 and a memory 204. The memory may contain a user identification module 206 that may in turn contain a user identifier 208 and/or user information 210. The user identifier 208 may be a unique number or code that uniquely identifies the user 102 of the mobile device 104. This user identifier 208 may be the same user identifier 208 that the user 102 uses for interacting with online retailers 126 and the like. In some implementations, the user identifier 208 may be entered by the user 102 into the mobile device 104 during a setup procedure such as by entering a user name and a password. In other implementations, the user identifier 208 may be included in hardware of the mobile device 104. For example, a unique serial number of the mobile device 104 may be linked with a user name and password when the user 102 purchases the device 104. As a further example, a subscriber identification module (SIM) on a removable SIM card within the device 104 may contain the user identifier 208. In this example, the user identifier 208 may be transferred between devices by moving the SIM card.

The device 104 may also contain user information 210 stored locally in the memory 204. This information may be configurable by the user 102 and can include payment information, a wish list of goods and/or services, past transaction histories, and/or any other information related to the user 102. Information stored in the user identification module 206 may be similar to information in the user information data store 120 shown in FIG. 1.

The memory 204 may also contain an electronic document 212. The electronic document may be any type of electronic document accessed by a computing device such as a word processing document, a spreadsheet document, an email, a web page, an eBook, and the like. In some implementations discussed below, the electronic document 212 may include a coupon. The coupon may be associated with one or more merchants.

The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any content that is in electronic or digital format.

In some implementations, the mobile device 104 may facilitate transactions either online or with a merchant 106 while the user 102 is present at that merchant. Transactions may be fully completed using the mobile device 104 for initiating and paying for the transaction. Digital or electronic coupons may occasionally be provided to the mobile device 104. These coupons may provide a discount to the user 102 of the mobile device 104 when he or she makes a purchase.

A coupon activation module 214 may regulate use and redemption of coupons based on geolocation and/or other factors. The coupon activation module 214 may activate a coupon when the mobile device 104 is located at a merchant 106. Prior to activation, the coupon activation module 214 may conceal all or part of the coupon from the user 102. For example, the user reading an electronic document 212 may be unable to see a coupon included in that electronic document 212 unless the user takes the mobile device 104 inside a certain merchant 106. In other examples, the user 102 may know that the electronic document 212 contains a coupon, but be unable to view the amount of discount or other aspect of the coupon until the user 102 and the mobile device 104 are at the merchant 106.

Mobile device 104 also includes one or more input and output devices 216. The output devices may comprise one or more display devices 218 including touch-screen displays that also function as an input device. An accelerometer 220 detects rotation or vibration of the mobile device 104. The mobile device 104 may also include a camera 222 capable of taking still or video pictures. An antenna 224 in the mobile device 104 may send and receive wireless signals from sources such as the radio antenna 114 and satellite 112. The antenna 224 may, in some implementations, communicate directly with a merchant 106 such as by exchanging wireless signals with the point-of-sale device 110 located at the merchant 106. The device 104 may further comprise other input/output devices 226, such as a microphone and a speaker used, for example, in an implementation in which the mobile device 104 functions as a telephone.

In some implementations, the mobile device 104 may also include a calendar/clock 228, a location sensor 230, and a network interface 232. The calendar/clock 228 may calculate time, date, and other data that can be derived from time data and date data. The location sensor 230 includes any sort of system that informs the mobile device 104 of its geolocation including, but not limited to, the Global Positioning System of satellites circling the Earth. Alternatively, the location sensor may determine geolocation by radio signal triangulation (e.g., triangulation based on radio antenna signal strength).

The network interface 232 may be configured for wirelessly communicating with the network 116. The network interface 232 may use any standard protocols for network communication. In some implementations, the network interface 232 may use the antenna 224 to send and receive data from the network 116. In further implementations, a network interface 232 may provide information to the location sensor 230 (e.g., a closest network access point) from which the location sensor 230 can infer or calculate a location of the mobile device 104. In some implementations, the coupon activation module 214 may activate a coupon in response to a signal received from a merchant 106 via the network interface 232. In other implementations the coupon activation 214 module may activate a coupon when the mobile device 104 is within a predetermined proximity of a merchant associated with the coupon.

Illustrative Server

Figure 3:
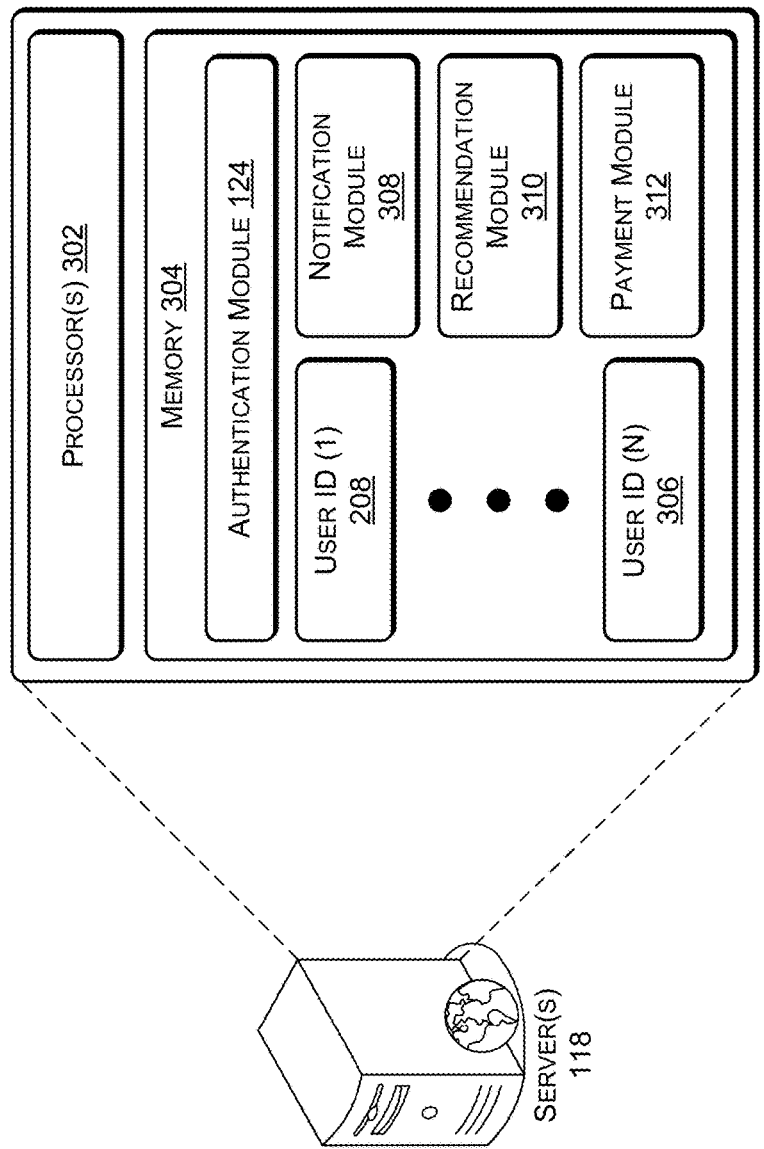
FIG. 3 shows the server(s) from FIG. 1 in greater detail.

FIG. 3 is a schematic representation of the server(s) 118 of FIG. 1. The one or more servers 118 may be implemented as a single computing device, a server farm comprising multiple servers, a distributed network, a cloud-computing configuration, and/or the like. The server(s) 118 comprises one or more processors 302 and a memory 304. The memory 304 may contain the same user identifier (1) 208 associated with the mobile device 104 FIG. 2. In some implementations, memory 304 may contain thousands or even millions of separate user identifiers represented here as User ID (N) 306 where N is any number greater than one. Each user identifier may be associated with a respective mobile device.

The user identifier 208 represents a user 102 that is interacting with the server(s) 118 via a mobile device 104. The authentication module 124 determines if communications coming from the mobile device 104 should be associated with the user identifier 208. In some implementations, authorization may involve handshaking or other verification between, for example, the authentication module 124 of the server(s) 118 and the mobile device 104. The authentication module 124 may similarly authenticate the identity of merchants 106 and/or online retailers 126.

The server(s) 118 may also include a notification module 308. In some implementations, the notification module 308 on the server(s) 118 provides a notification in the form of an e-mail, text, or similar message to the mobile device 104. The notification may be sent when there is a match between a good and/or service of interest to the user 102 and a good and/or service offered by a merchant 106 within a predetermined proximity of the geolocation of the mobile device 104. In some implementations, the notification module 308 may send a notification to the merchant 106 informing the merchant that a nearby user 102 may be interested in a good or service offered by the merchant 106.

A recommendation module 310 stored on the server(s) 118 may provide recommendations to the mobile device 104. The recommendations may suggest to the user 102 of the mobile device 104 nearby merchants 106 that sell a good or service in which the user 102 may have an interest. The recommendation module 310 may also identify nearby merchants 106 that offer a discount in the form of a coupon or such to the user 102. In some implementations, the recommendation module 310 may also recommend goods or services for sale by online retailers 126. The recommendation of an online retailer 126 may be provided together with recommendation for a nearby merchant 106. Depending on the goods and/or services sold by the merchant 106 and the online retailer 126, the relationship may be one of competition or collaboration. In a relationship deemed to be competitive, the recommendation module 310 may inform the user 102 that a nearby merchant 106 and an online retailer 126 both offer the same in good or service for sale. However, in a relationship deemed to be complementary, the online retailer 126 may offer something that is not available from the nearby merchant 106 but may enhance or complement a good or service sold by that merchant 106.

The server(s) 118 may also facilitate advertising via communications (e.g., notifications, recommendations, and the like) sent from or on behalf of the merchant 106 to the mobile device 104. For example, an entity that controls the server(s) 118 may generate revenue by charging merchants 106 and/or online retailers 126 for the privilege of being included in notifications sent from the notification module 308 and/or recommendations sent from the recommendation module 310. A payment module 312 in the server(s) 118 may receive and process payments from merchants 106 and/or online retailers 126. The payments may be in the form of a "virtual" currency or points that are accepted as payment by the entity that controls the server(s) 118 but are not a standard currency. Users 102 may opt in to receive notifications and recommendations provided by the server(s) 118. The payment received by the payment module 312 may be structured as a flat fee, a per unit fee, or determined by bidding between various merchants 106 and/or online retailers 126. The operator of the server 118 may structure the payment system so as to maximize revenue paid by the merchants 106 and/or online retailers 126.

Figure 4:
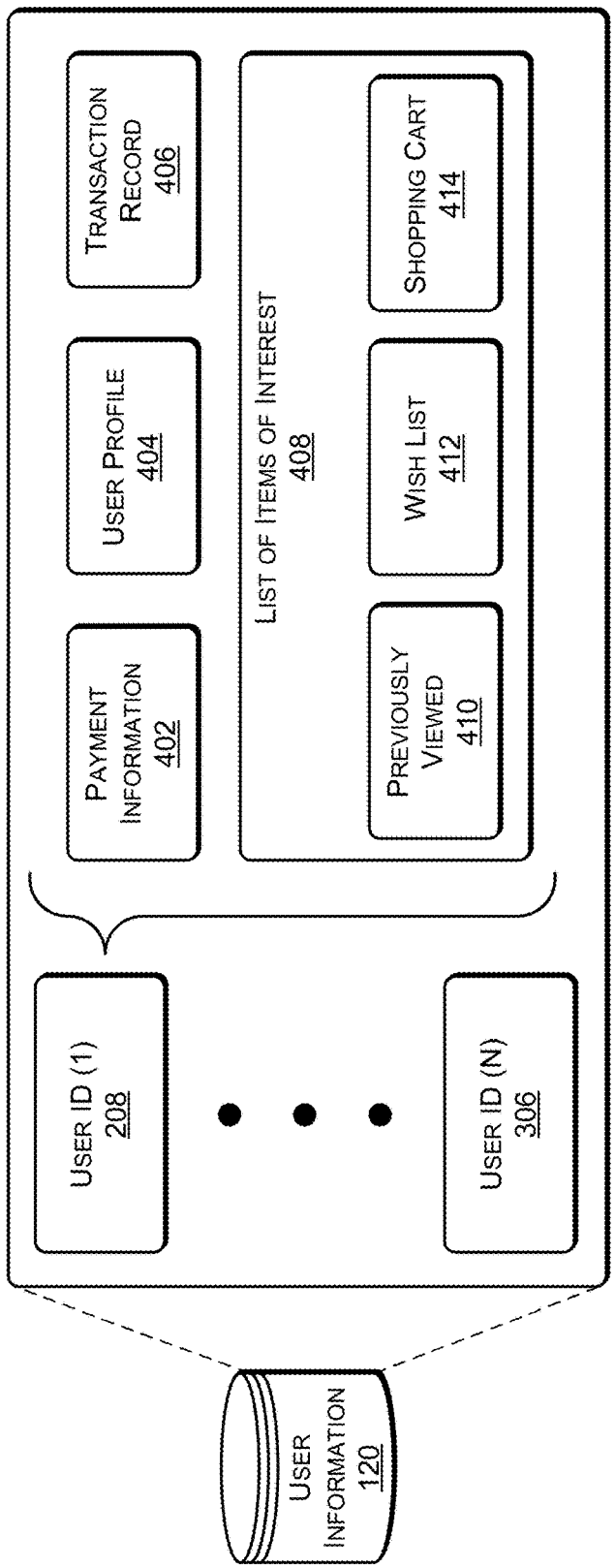
FIG. 4 shows the user information from FIG. 1 in greater detail.

FIG. 4 is a data store including user information 120 that may be included within or connected to the server(s) 118. The user information 120 may contain some or all of the same information stored as user information 210 on the mobile device 104. In some implementations, the user information 120 stored on the server(s) 118 may be used to backup or restore the user information 210 on the mobile device 104 if, for example, the mobile device 104 is lost or damaged.

The user information 120 may provide separate data associated with each of the user identifiers 208-306 shown in FIG. 3. For example, User ID (1) 208 may be associated with payment information 402, a user profile 404, a transaction record 406, and a list of goods and/or services of interest to the user 408. The payment information 402 may include such things as credit card or debit card numbers, bank account information, electronic payment system information, and/or the like. The user profile 404 may contain user preferences, lists of interests and hobbies, indications of which types of communications and/or transactions the user 102 has selected to receive, personal information such as preferences for a matchmaking service, and any other type of information associated with the user 102 and his or her User ID (1) 208. The transaction record 406 may contain a past transaction history comprising the identity of the seller (e.g., which merchant 106 or online retailer 126), time, geolocation, and subject of the transaction.

The list of items of interest to the user 408 may provide a list of goods and/or services that the user 102 might wish to purchase. The user's desires may be inferred from past activity by the user 102 in which he or she explicitly or implicitly indicated an interest in some good or service. For example, a list of previously viewed goods and/or services 410 may track those web pages or good/service descriptions that the user 102 has viewed previously in a web browser or another format. More definitive indications of the user's interest may be determined by reviewing the contents of a wish list 412 that the user 102 has generated himself or herself. The user 102 may establish a wish list on multiple online retailers 126, on another location such as a personal website, etc. and all of the different wish lists may be merged into the wish list 412 stored as part of the user information 120. An even stronger indication of what the user 102 is likely to buy may be determined by viewing the contents of an online shopping cart 414. The shopping cart 414 may represent those goods or services that the user 102 has begun, but not finished, purchasing from an online retailer 126. For some online retailers 126, a shopping cart may disappear if the user 102 does not complete the purchase within a fixed period of time, but for other online retailers 126 a virtual shopping cart may persist indefinitely. A user 102 could have multiple shopping carts at various online retailers 126 each containing one or more goods or services. The shopping cart 414 included in the user information 120 may represent an aggregation of the individual shopping carts from multiple different online retailers 126.

Figure 5:
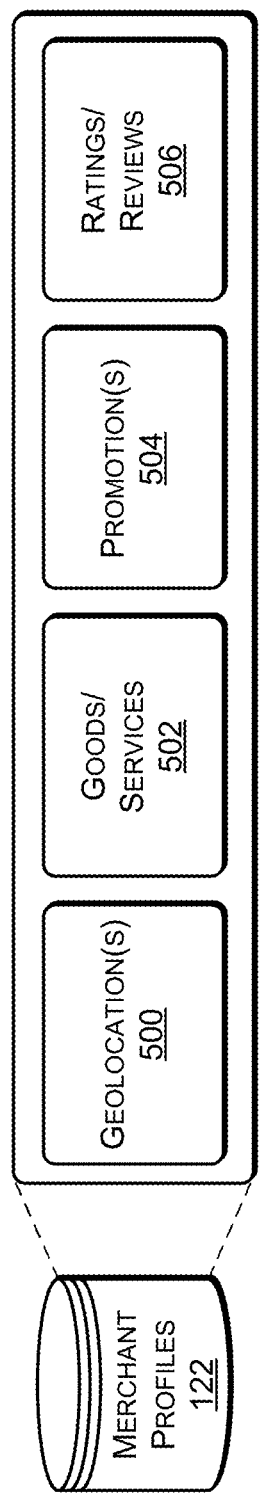
FIG. 5 shows the merchant profiles from FIG. 1 in greater detail.

FIG. 5 is a data store including merchant profiles 122 that may be included within or connected to the server(s) 118. The merchant profiles 122 contain information about the merchant 106 such as geolocations 500 of the merchant's brick-and-mortar locations, goods and/or services 502 offered for sale by the merchant 106, one or more promotions 504 offered by the merchant, reviews and ratings of the merchant 506, and other data.

The geolocations 500 may be one source of data used to determine whether a mobile device 104 is "near" or within a predetermined proximity of a merchant location. In some implementations, the geolocations 500 may be stored as coordinates such as latitude and longitude and compared with a coordinates of the mobile device 104 such as latitude and longitude determined by a GPS. The goods and/or services 502 available at the merchant 106 may be a real-time or near real-time list of inventory or the identified goods and/or services 502 may indicate things that the merchant 106 typically offers for sale without regard to current availability.

The promotions 504 may include things such as coupons or discounts for the goods or services offered by the merchant. The promotions 504 may also be usable at a different merchant. For example, by logging in or checking in at a first merchant the user may receive a promotion that is redeemable at a second, different merchant. The first merchant may pay some or all of the costs associated with providing the promotion at the second merchant. The promotions 504 may, for example, give a discount to a user 102 based on the user information 120 for that user 102. For example, a merchant 106 may provide a coupon to a user 102 of a mobile device 104 for items that are included in a user's wish list 412. The coupons may provide a fixed discount or a percentage discount. For example, a coupon may provide the recipient with a fixed savings of $20 for any purchase of $50 or more. Alternatively, the coupon may provide a 50% off discount. Similarly, the coupon may provide for buy-one-get-one-free, buy-two-get-the-third-free, or similar types of discounts related to a number of items purchased.

The reviews and ratings 506 of the merchant may be provided by professional editors or reviewers or by voting or group rating from several users.

Illustrative Notifications and Recommendations Based on Geolocation

Figure 6:
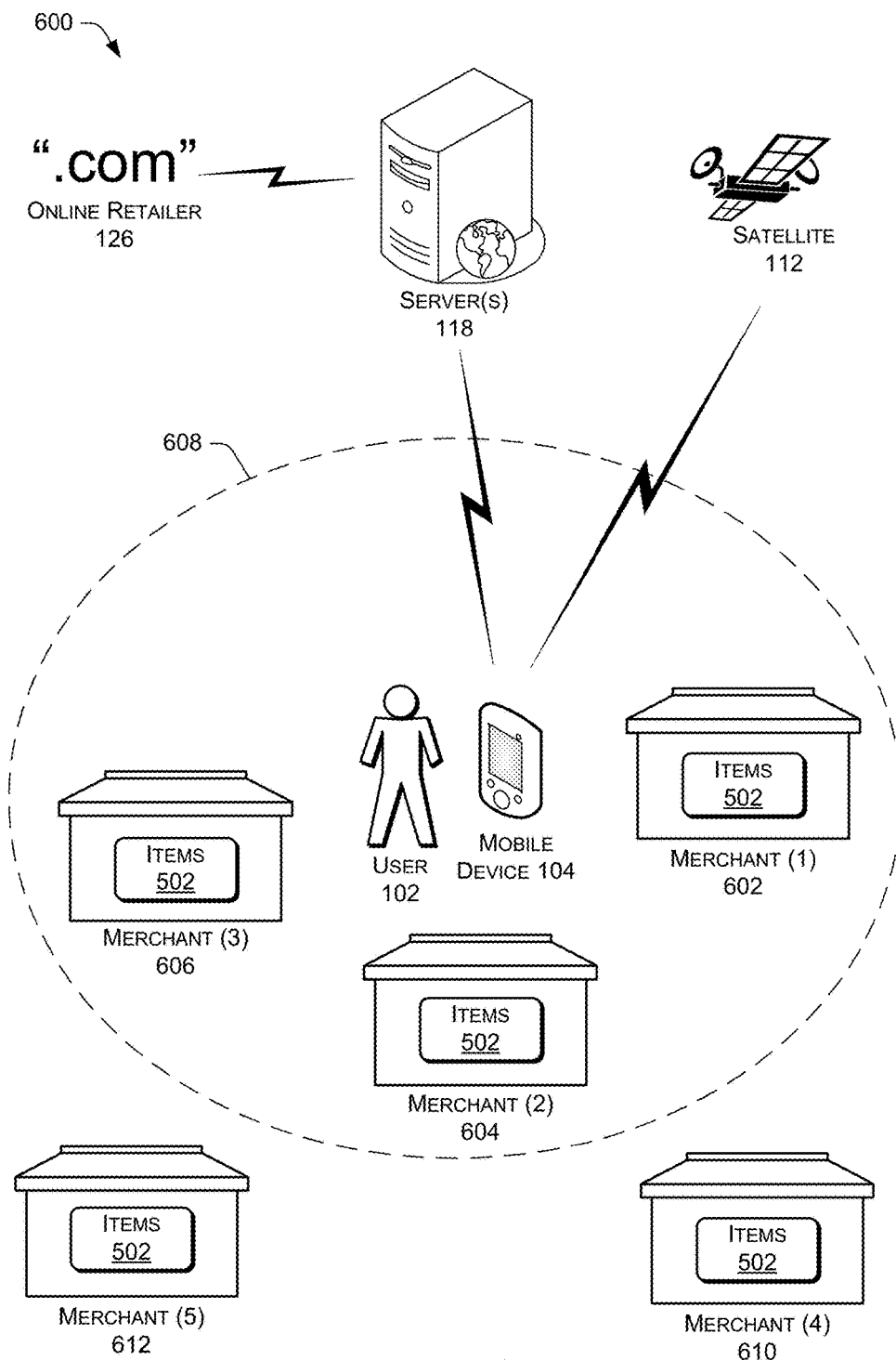
FIG. 6 shows an illustrative architecture for a user of a mobile device to selectively interact with merchants having certain goods and/or services for sale within a predetermined proximity of the mobile device.

FIG. 6 shows an illustrative architecture 600 in which a representative user 102 receives information about nearby merchants on a mobile device 104. The user 102 and his or her mobile device 104 may be located near several merchants represented here as merchant (1) 602 merchant (2) 604, and merchant (3) 606. The merchants may be similar to the merchant 106 shown in FIG. 1. The location of the mobile device 104 may be determined by the location sensor 230 shown in FIG. 2. For example, the satellite 112 may provide global positioning information to the mobile device 104. The locations of the various merchants 602, 604, and 606 may be provided directly to the mobile device 104 (e.g., by wireless radio wave transmissions) or included as a geolocation 500 stored in a merchant profile 122 available to the server(s) 118. In this implementation, the server(s) 118 may compare a geolocation of the merchants 602, 604, and 606 with a geolocation of the mobile device 104 to determine the relative proximity of the user 102 with the merchants 602, 604, and 606.

The concept of "near" may be determined by a predetermined proximity, such as a circle 608, centered on the user 102 and the mobile device 104. The size of the circle 608, which may be represented by a radius, may vary based on geolocation of the mobile device 104, user preferences set by the user 102, a strength of wireless signals received by the mobile device 104, or other factors. The size of the circle 608 may also vary over time and vary based the nature of an interaction between the user 102 and the mobile device 104. Although illustrated here as a circle 608, the predetermined proximity relative to the mobile device 104 may have any shape. For example, if the user 102 is in an urban environment where streets are arranged in a regular grid pattern, the shape may be a square or rectangle.

The location of the circle 608 or the point about which the circle is centered may in some implementations be based on a fixed location rather than the current location of the mobile device 104. For example, the user 102 may provide his or her home, work, or other address. The user 102 may frequently shop around this fixed location and may also frequently return to this fixed location. Thus, in some implementations the user 102 may receive notifications of coupons that are useful at merchants near his or her home, office, etc. even when his or her mobile device 104 is at another geolocation.

The architecture 600 also shows a merchant (4) 610 and a merchant (5) 612 that are outside the predetermined proximity of the mobile device 104. In some implementations, information about these merchants 610 and 612 may not be provided to the user 102 because the merchants 610 and 612 are deemed too far away. Although three merchants 602, 604, and 606 are shown as being within the predetermined proximity and two merchants 610 and 612 are shown as being outside of the predetermined proximity, these numbers are only illustrative and any number of merchants (including zero) may be inside or outside of the predetermined proximity.

Each of the merchants 602, 604, 606, 610, and 612 may be associated with items 502 offered for sale by that merchant. The specific items that are available may be identified by the server(s) 118 in reference to the merchant profiles 122 of each of the respective merchants 602, 604, 606, 610, and 612.

The server(s) 118 may also have access to the user information 120 as shown in FIG. 4. The user identifier 208 associated with the mobile device 104 and that user's user information 120 may allow the server(s) 118 to compare a list of items of interest 408 to the user with the goods and/or services 502 offered for sale by the various merchants. When there is a match and the matching merchant is within the circle 608 or predetermined proximity of the mobile device 104, the user 102 may be notified of the match.

One or more online retailers 126 may also be in communication with the server(s) 118 and or in communication with the mobile device 104. In some implementations, the server(s) 118 may compare goods and/or services offered by the online retailer(s) 126 with goods and/or services 502 offered by the nearby merchants 602, 604, and 606 and make a recommendation to the user 102 that includes either or both of the offerings from the online retailer(s) 126 and from the nearby merchants 602, 604, and 606.

The information provided to the user 102 in the form of a notification, recommendation, or communication may be a type of advertisement in which the nearby merchants 602, 604, and 606 compete with other brick-and-mortar merchants as well as the online retailers 126 to make a sale to the user 102. For example, the nearby merchants 602, 604, and 606 may use data from the "online world" such as the transaction record 406 or list of items of interest 408 to the user to try to drive brick-and-mortar sales. Alternatively, the merchants 602, 604, and 606 may submit lists of goods and/or services available for sale as well as promotions such as coupons to an online repository such as the merchant profiles 122 shown in FIGS. 1 and 5. The online repository (e.g. server(s) 108 connected to the merchant profiles 122) may analyze characteristics of the users to determine which users receive promotions or notifications regarding the merchants 602, 604, and 606. Conversely, the online retailers 126 may have information about their items sent together with information about the items 502 at the local merchants 602, 604, and 606. If the online retailers 126 can offer a lower price, this may dissuade the user 102 from making a purchase from the brick-and-mortar merchant. Other types of competitive and collaborative relationships between online retailers and off-line merchants that utilize geolocation of the mobile device 104 and user information 120 are discussed below.

Figure 7A:
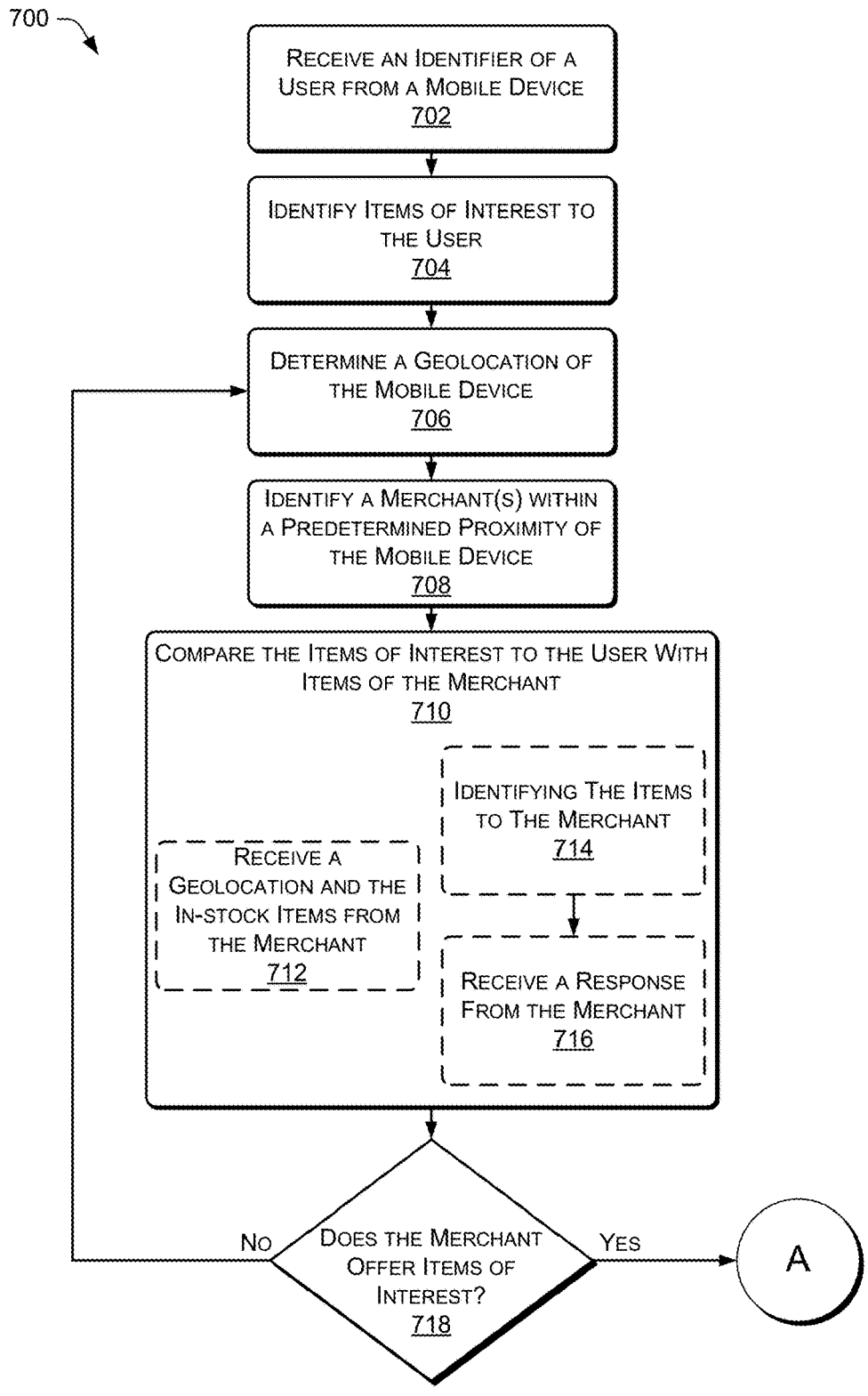
FIGS. 7a and 7b are a flow diagram of an illustrative process for notifying a user of a mobile device when a nearby merchant has a good or service for sale that is of interest to the user.
Figure 7B:
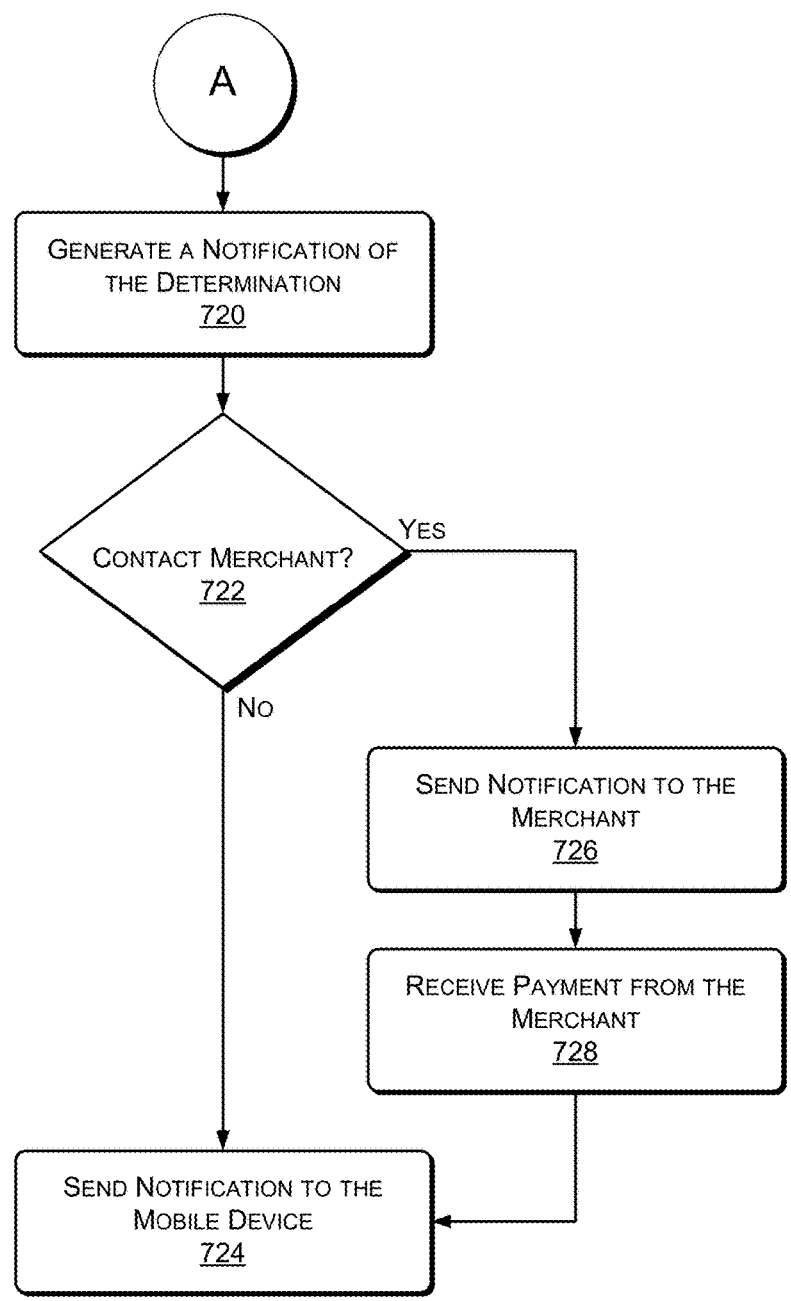

FIGS. 7a and 7b illustrates a process 700 for sending a notification about items available at a merchant to a user of a mobile device. At operation 702, an identifier of a user is received from a mobile device. The identifier of the user may be the same or similar to the user identifier 208 shown in FIGS. 2-4.

At operation 704, items of interest to the user may be identified. Identification of which items are of interest to the user may be based on the identifier of the user. The items of interest to the user may be a list of goods and/or services that the user has previously viewed, a wish list of goods and/or services, a list of goods and/or services included in a shopping cart that the user has with an online retailer, items identified in a user profile associated with the user, or another similar source of information about the user's interests. The user profile may be similar to the user profile 404 shown in FIG. 4. For example, the user may also manually select categories of goods and/or services of interest and these categories may be stored as part of the user profile. The user profile may also be linked to a social network or list of friends and items of interest to the user may be inferred from items or interest, including items purchased, by friends or social network contacts. The user profile may also be partially or entirely imported from an external source such as a website managing the social network. The identifier of the user may provide access to the user's account on the social network (or other) site, and thus, provide access to an external user profile.

At operation 706, a geolocation of the mobile device is determined. The geolocation may be determined by the location sensor 230 shown in FIG. 2.

At operation 708, a merchant or plurality of merchants is identified that is within a predetermined proximity of the geolocation of the mobile device. The merchant(s) may be identified by referencing a map of merchant locations and comparing the map with the geolocation of the mobile device to determine distances between the mobile device and various merchants. The predetermined proximity may be a distance such as a radius that forms a circle around the user as shown in FIG. 6.

At operation 710 the items identified at operation 704 are compared with items offered by the merchant identified at operation 708. Conversely, the items offered by the merchant at operation 708 may be compared with the items identified at operation 704. This way, the merchant may identify if its offered items are similar to any of the items of interest to the user. The offered items may include any goods and/or services in the inventory of that merchant.

In one implementation, the geolocation of the merchant and the currently in stock items of the merchant may be received from the merchant at operation 712. For example, the merchant may submit its geolocation and list of current inventory to a server for incorporation in a merchant profile such as the merchant profiles 122 shown in FIG. 5. A server, such as the server(s) 118 discussed above, may compare the items of interest to the user and the merchant's inventory without revealing any of the user's information to the merchant. This may allow the user to receive the benefit of knowing when a nearby merchant is offering items that match, or are related to, his or her interests without having to reveal information to the merchant.

In another implementation, a list of the items of interest to the user is provided to the merchant at operation 714. The comparison may be performed by the merchant and then a response may be received from the merchant at operation 716. Either or both of the user and the server may receive the response. The response may indicate a "yes" or "no" depending on if the merchant has items that match the user's interests. The response may also indicate a payment or payment commitment from the merchant to the source (e.g., the server) that identified the items of interest to the user. Providing the items of interest to the user directly to the merchant may allow the list to be compared with the merchant's inventory without requiring a server. This may be appropriate when the mobile device can communicate directly with the merchant, but the mobile device is unable to access a network connection for communicating with a server.

Irrespective of the techniques used for making the comparison, at operation 718, it is determined whether or not the merchant offers items of interest to the user or items related to items of interest to the user. For example, if a baseball is an item of interest to the user it may be inferred that a bat or glove, although not direct matches, would also be of interest to the user. If no match exists, process 700 proceeds along the "no" path and returns to operation 706. As the mobile device moves, different merchants may come within the predetermined proximity of the mobile device and one of these new merchants may offer an item that is of interest to the user. If the merchant does offer an item of interest to the user, process 700 proceeds along the "yes" path. The following portions of process 700 are shown on FIG. 7b.

At operation 720, a notification of the determination from operation 718 is generated. The notification may simply state that a match exists. However, the notification may also identify such things as which item of interest to the user is offered by the merchant, which nearby merchant offers that item for sale, a map to the merchant, a price of the good or service, any coupon or discount available for the good or service, a redemption period for the coupon or discount, a maximum number of items available per person, and/or other information.

When a plurality of merchants is identified at operation 708, the notification may include a list or map of those merchants. If the identified merchants are relatively nearby (e.g., within 100 yards) the notification may be a list of the merchants showing a distance to the merchants. If the identified merchants are farther away (e.g., within five miles) the notification may include a map showing the locations of the merchants. The notification may also include the price of the item at the merchants so that the user can easily compare prices.

At operation 722, a decision is made to contact or not to contact the merchant. This decision may be based on a user profile or other type of information about the user that is associated with the identifier of the user. When the merchant is not contacted, process 700 proceeds along the "no" path to operation 724.

At operation 724, the notification generated at operation 720 is sent to the mobile device. For example, the items identified at operation 704 may be a list of goods and/or services the user has on a shopping list for Christmas or another holiday. As the user, with his or her mobile device, moves through a shopping mall the mobile device may receive a series of notifications telling the user which items from his or her shopping list are at which stores. This may allow the user to quickly find and purchase the items on his or her list and this technique may also allow the user to find the merchant with the lowest price for items on the list.

If at operation 722 the decision is made to contact the merchant, then process 700 proceeds along "yes" path to operation 726. At operation 726, the notification generated at operation 720 is sent to the merchant. Once informed that the merchant offers items that are of interest to the user, the merchant may wish to contact the user of the mobile device with the hope of making a sale. The decision to contact the user may be based on an available and unused inventory of the merchant. For example, if the merchant is a service provider like a spa or a restaurant the merchant may have relatively fixed costs, and thus, be concerned about minimizing unused capacity. The merchant may decide how many users to contact and how aggressively to promote a item of interest to the user based on the merchant's excess capacity or excess inventory.

At operation 728, a payment may be received from the merchant. The payment may be received by a server implementing the process 700 such as, for example, the server(s) 118 shown in FIGS. 1 and 3. The payment may be received and processed by the payment module 312 shown in FIG. 3. Responsive to receiving the payment, the process 700 may proceed to operation 724 and send a notification to the mobile device. The payment amount may be arrived at through a bidding process between multiple merchants. For example, when more than one merchant within the predetermined proximity of the mobile device has the same good or service for sale, each of those merchants may place competitive bids and the merchant with the winning bid may be included in the notification sent to the mobile device at operation 724.

The notification to the mobile device sent at operation 724 may also included a coupon for one of the goods or services of interest to the user. Merchants may choose to have coupons included in the notification in order to encourage the user to purchase the good or service that matches his or her interests. The user's interest may be determined from the user information 120 shown in FIG. 4. In some implementations, data mining techniques may be applied to the user information in order to infer the user's interests. For example, if the user's interests are derived from an online shopping cart the user has established with an online merchant, the merchant may provide a coupon that lowers the price of the goods or service to equal or less than the price offered by the online retailer. The online retailers may choose to reveal the contents of online shopping carts and the price of the items in those shopping carts to the merchants only if the merchants compensate the online retailer for "taking" the sale. For example, if the online retailer's profit margin generates profits of one dollar for the sale of a certain good, then the online retailer may provide shopping cart information to the merchant in exchange for a fee of one dollar. The fee may also be contingent on whether or not the user actually purchases the good from the merchant. In some implementations, payments from the merchant to an online retailer may be mediated by the server(s) 118.

As discussed above, the notification may also be a map showing locations of merchants that have items matching the items of interest to the user. For example, each indication on the map of a merchant location may provide additional information about that merchant (e.g., in a pop-up window) such as the list of matching or similar items, item prices, identification of coupons or deals available to the user the mobile device, and the like.

Figure 8:
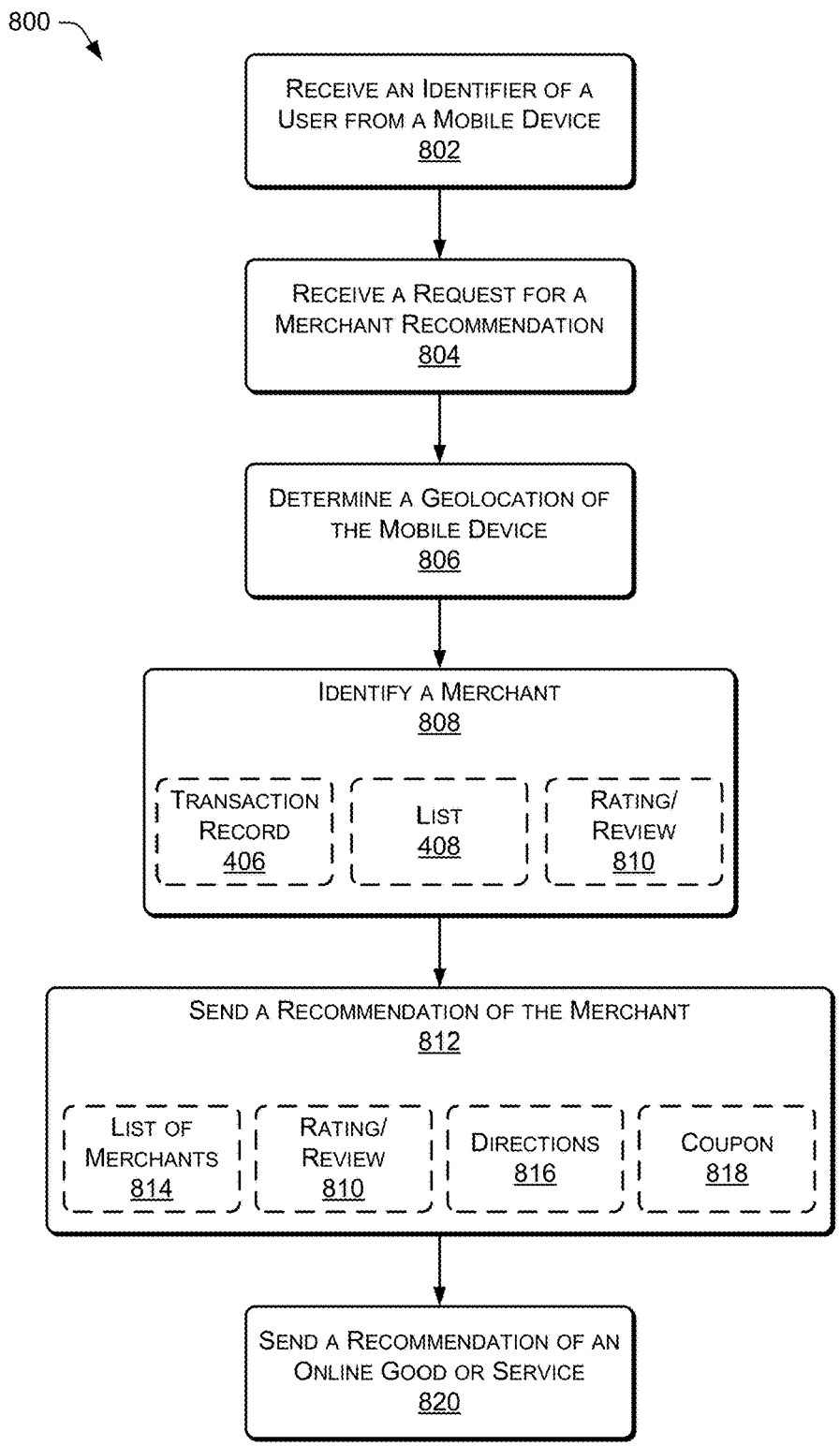
FIG. 8 is a flow diagram of an illustrative process for recommending a nearby merchant and an online good or service to a user of a mobile device.

FIG. 8 illustrates a process 800 for providing recommendations of online purchases together with information about a nearby brick-and-mortar merchant. At operation 802, an identifier of a user is received from a mobile device. Similar to operation 702 shown in FIG. 7, receiving an identifier of a user can function to associate information about the user with the mobile device.

At operation 804, a request for recommendation of a merchant that is within a predetermined proximity of the mobile device is received. In some implementations, the request may be sent manually by the user of the mobile device for example in response to the user pressing a "recommend nearby merchants" button. In other implementations, the request may be transmitted automatically by the mobile device.

At operation 806, the geolocation of the mobile device is determined. The geolocation may be determined by the location sensor 230 shown in FIG. 2.

At operation 808, a merchant within the predetermined proximity of the mobile device that also provides a discount to the user of the mobile device is identified. The discount may be based on an attribute associated with the identifier of the user received at operation 802. For example, if the user is a member of a group that receives a discount at a particular merchant, then that merchant may be identified if the user-member is within the predetermined proximity. If the merchant is nearby the users home or work address then the contact information of the user may be a source of determining eligibility for a discount. Similarly, financial information of the user such as a type of credit card owned by the user or a credit score may provide the user with access to discounts that are not universally available. When more than one merchant within the predetermined proximity of the mobile device offers a discount to the user of the mobile device, a plurality of merchants within the predetermined proximity may be identified. The geolocations of each of the plurality of merchants may be used to generate a map, for example with "flags" or "pins" in the map showing the location of the merchants. This map may be sent to the mobile device of the user so that the user can navigate to and select from the plurality of merchants.

In some implementations, a merchant or merchants may be identified based on a transaction record 406 of the user. For example, the transaction record 406 may identify merchants with which the user has a pre-existing relationship. The transaction record 406 may also identify merchants at which the user has previously used a coupon or otherwise received a discount.

In other implementations, the merchant may be identified based on a list of goods and/or services 408 of interest to the user. This list 408 may be any of the types of lists shown in FIG. 4 such as a list of goods and/or services that the user has previously viewed, a wish list of goods and/or services, a list of goods and/or services in a shopping cart associated with the user or a list derived directly or indirectly from information in a user profile of the user. For example, the user's interest may be inferred by identifying those merchants at which the user has logged in to an online system from his or her mobile device.

In further implementations, a merchant may be identified based on ratings or reviews 810 of that merchant. The ratings and reviews 810 may be the same as the ratings and reviews 506 from the merchant profiles 122 shown in FIG. 5. For example, only high-ranked merchants (e.g., four-star or five-star ranking) may be eligible to be identified. The use of ratings and/or reviews 810 to identify merchant may also involve social networking as a source for the ratings and reviews 810. Thus, ratings and/or reviews 810 from others the user's social network may be a source, or the sole source, of ratings and reviews 810 used to identify the merchant.

At operation 812, a recommendation of the merchant is sent to the mobile device. In some implementations, the recommendation may be generated and sent by the recommendation module 310 of the server(s) 118 that is shown in FIG. 3. The recommendation provides user with information about a merchant that is both nearby and that provides a discount to the user.

The recommendation of the merchant may include a list of merchants 814 when multiple merchants within the predetermined proximity match the criteria specified by the user. The recommendation may also be accompanied by ratings or reviews 810 of the merchant derived from other users, professional reviews, and the like. The ratings and reviews 810 may also be included in the recommendation. If the ratings and reviews 810 were not used to identify the merchant at operation 808, the user may consider the ratings and reviews 810 when evaluating the recommendation. The recommendation may also included directions 816 to the merchant. In some implementations, a coupon 818 for the merchant may be included with the recommendation. The coupon 818 may provide an additional discount beyond the discount associated with the user identifier. The recommendation sent at operation 810 may also include any combination of the above features.

At operation 820, a recommendation for a good or service available from an online retailer is also sent to the mobile device. This recommendation may be generated by the recommendation module 310. The recommendation for the good or service available online may be an advertisement that encourages the user to purchase the good or service from the online retailer. The good or service available online may be competitive with the goods and/or services offered by the merchant recommended at operation 810. In other words, the user may be provided with information about where to purchase a good or service at a nearby merchant and information about how to purchase a same or similar good or service from an online retailer.

In some implementations, the online retailer may pay an advertising fee (e.g., to the entity that operates the server(s) 118) in order to have a recommendation sent to the mobile device. Conversely, the merchant may also be provided an opportunity to pay a fee to limit potential online competitors from having a recommendation piggybacked onto the recommendation of the merchant. For example, merchants may request that when they are included in a recommendation sent at operation 812 that the recommendation for an online good or service sent at operation 820 recommends something from that merchant's online store, recommends something from any online merchant except for a specified list of "rival" online merchants, or otherwise influence the recommendation provided that operation 820. The online retailer and the merchant may also compete or bid against each other for control of the recommendation provided at operation 820.

In other implementations, the good or service available from the online retailer may be a good or service that has been deemed complementary to the goods and/or services offered by the merchant. The user, the merchant, the online retailer, a server or any other entity may make determinations as to which goods and/or services are complementary.

Illustrative Promotions Based on Geolocation

Figure 9:
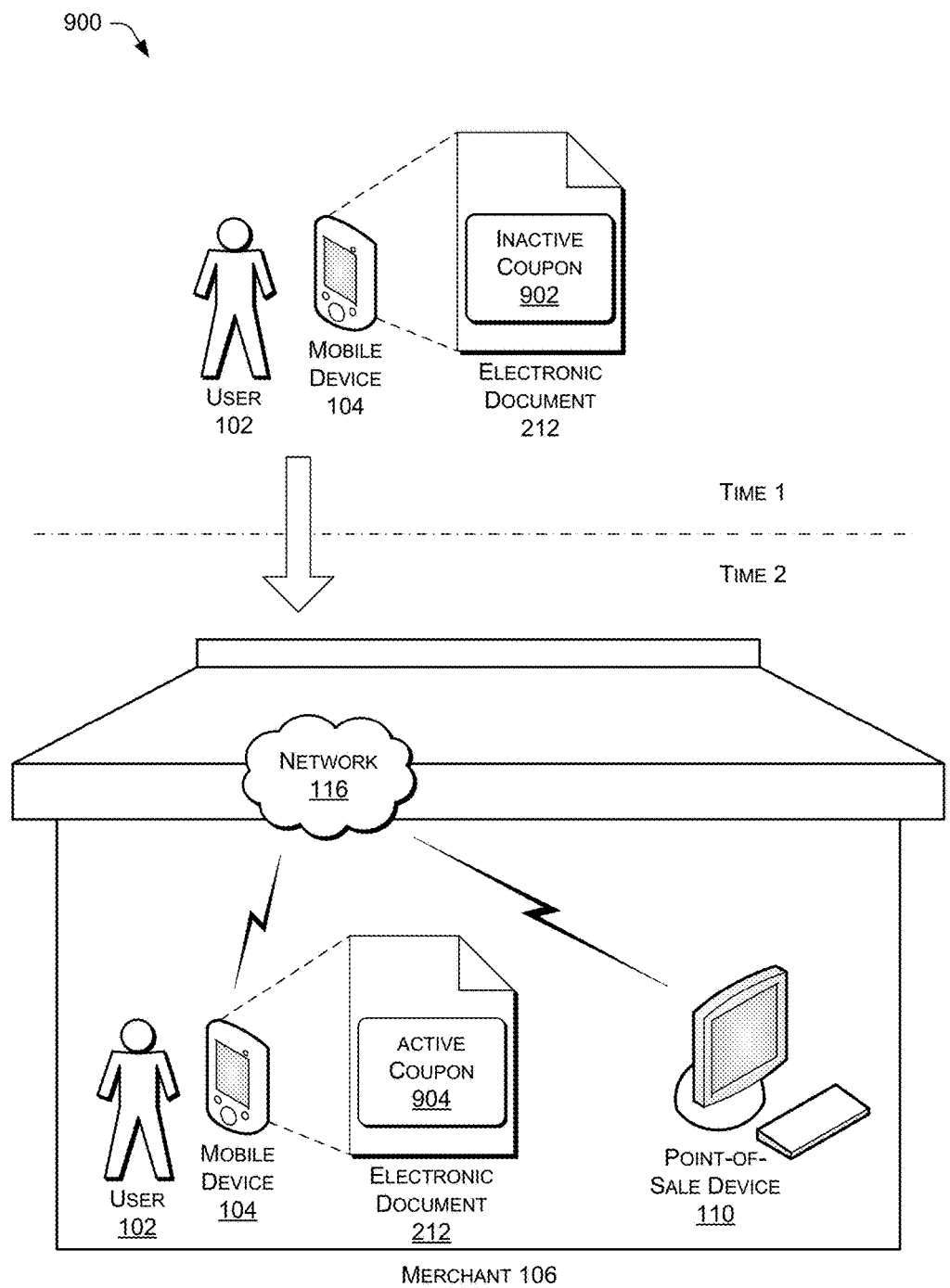
FIG. 9 shows an illustrative timeline in which an electronic document on a mobile device contains a coupon that is activated when the mobile device is located at a merchant.

FIG. 9 shows an illustrative timeline 900 showing activation of a coupon or other promotion when the mobile device 104 is at a merchant 106. The coupon, or other promotion, may be tied to a specific geolocation so that the user 102 can only redeem the coupon when he or she is located at a particular merchant 106. This may drive foot traffic to the merchant 106 because users may wish to activate and redeem the coupon. Even if the coupon is unrelated to the goods and/or services sold by the merchant 106, this may provide a benefit for the merchant 106 because the users once at the merchant 106 might purchase a good and/or service.

At time 1, the mobile device has an electronic document 212 stored in memory as shown in FIG. 2. In some implementations, this electronic document 212 may be an electronic book or an eBook. The electronic document 212 includes an inactive coupon 902 within the document. The inactive coupon 902 may be included as part of the text or other content of the electronic document 212. The inactive coupon 902 may also be attached to or otherwise appended to the electronic document 212. The inactive coupon 902 may also be provided as a stand-alone product that is not included in an electronic document 212.

When the user 102 and the mobile device 104 are not located at the merchant 106 the inactive coupon 902 may remain inactive. The inactive/active status of the coupon may be regulated by the coupon activation module 214 of the mobile device 104 shown in FIG. 2. In some implementations, the inactive coupon 902 may be concealed from the user 102 of the mobile device 104 until the mobile device 104 is located at the merchant 106. In other implementations, only one or more aspects of the coupon are concealed. Alternatively, all aspects of the coupon may be revealed to the user 102 even when the mobile device 104 is not located at the merchant 106. If the inactive coupon 902 is provided by itself without an electronic document 212, the existence of the inactive coupon 902 may not be wholly concealed from the user 102, but the specific nature of the "deal" or coupon may be concealed. For example, a user may be able to tell that he or she has an inactive coupon 902 from a certain merchant, but not know what the coupon is for or the size of the discount. Curiosity may drive foot traffic to the merchants that provide this type of partially-hidden coupon.

In some implementations in which the coupon is fully concealed, the coupon may function like a surprise or "Easter egg" that unexpectedly rewards the user. Once one person discovers the existence of the coupon, this information may spread informally or "virally" and can create a further incentive for additional people to obtain the electronic document 212. In implementations in which only some aspects of the coupon are concealed, the merchant at which the coupon can be redeemed may be exposed to the user 102, but other details such as the amount of discount may remain concealed.

At time 2, when the user 102 and the mobile device 104 arrive at the merchant 106, the coupon may become an active coupon 904. Activation may also be linked to time. A coupon may not become an active coupon 904 unless the current time matches a time specified by the inactive coupon 902. For example, in order to encourage repeat business a coupon may not be active until the following day. Thus, in some implementations, both time and place must be as specified in order for an inactive coupon 902 to become an active coupon 904.

Activation of the coupon may be implemented by the mobile device 104 receiving a signal from the point-of-sale device 110 or from the network 116. Activation may also be implemented by the coupon activation module 214 alone or in conjunction with other components of the mobile device 104 such as the location sensor 230 and/or the calendar/clock 228. The location sensor 230 may determine that the geolocation of the mobile device 104 corresponds to the geolocation of the merchant 106 and the coupon activation module 214 may activate the coupon. For coupons that are valid only during a certain time period, the calendar/clock 228 may also determine if the current time is within a time period specified for redemption of the coupon. At this point, any aspects of the coupon that were concealed may be revealed to the user 102.

Figure 10:
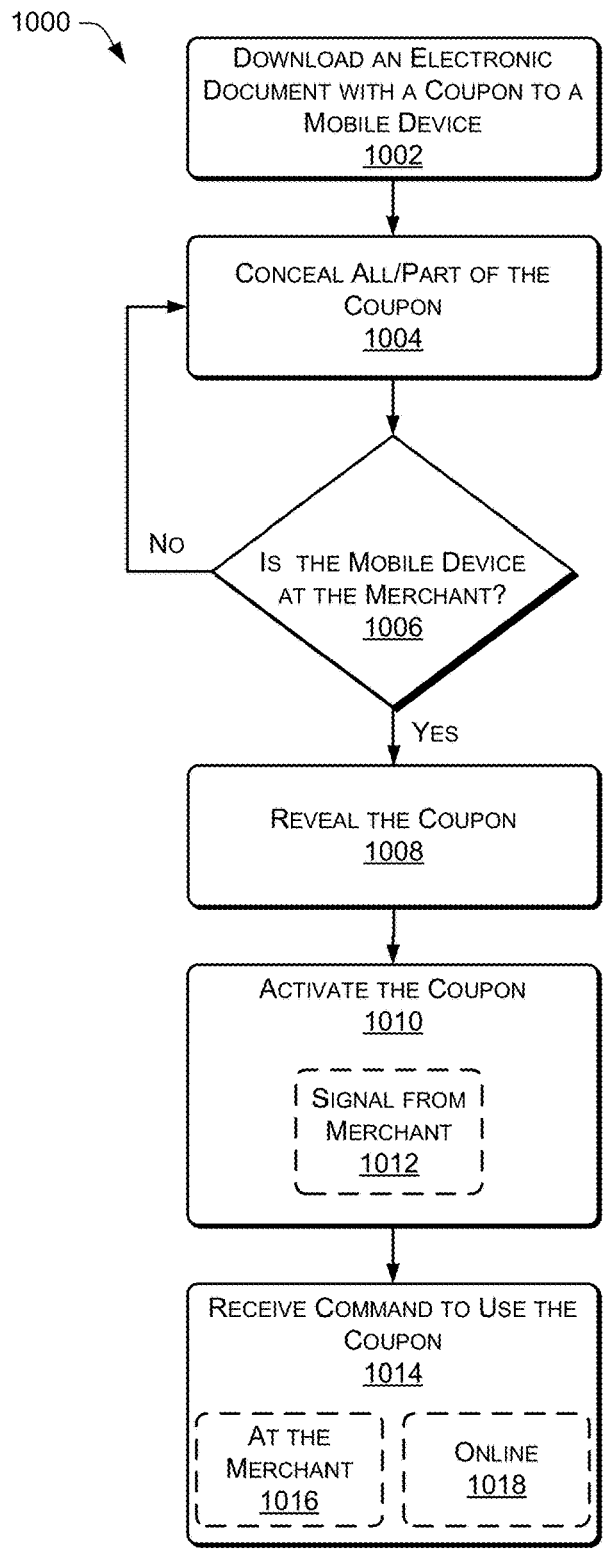
FIG. 10 is a flow diagram of an illustrative process for activating a coupon in an electronic document when a mobile device is located a merchant.

FIG. 10 shows an illustrative process 1000 for activating and using a coupon in an electronic document. At operation 1002, an electronic document containing a coupon may be downloaded to a mobile device. Depending on the relative perceived value of the electronic document and of the coupon, the user of the mobile device may choose to initiate the download primarily to receive the electronic document or primarily to receive the coupon.

At operation 1004, all or part of the coupon may be concealed when the mobile device is not located at the merchant. This may tie the value of the coupon to the user's presence at the merchant. Thus, for example, a coffee shop may pay to have coupons placed in eBooks in order to bring people into the coffee shop to redeem the coupon with the hope that those people will buy something from the coffee shop.

At operation 1006, it is determined if the mobile device storing, in memory, the electronic document that contains the coupon is at the merchant. The mobile device may be characterized as being "at" the merchant when the mobile device is within a predetermined proximity of the merchant. The mobile device may also be determined to be at the merchant when the mobile device receives a signal from the merchant. The signal may be a "heartbeat" or "ping" that is transmitted only over a short distance. When the mobile device is at the merchant, process 1000 follows the "yes" path to operation 1008. When the mobile device is not at the merchant, process 1000 follows the "no" path and returns to operation 1004 where all or part of the coupon may remain concealed.

At operation 1008, any part of the coupon that was concealed may be revealed or shown to the user. At operation 1010 when the mobile device is at the merchant, the coupon is activated. In some implementations the coupon activation module 214 of the mobile device may activate the coupon. The coupon may be activated in response to determining that the mobile device is located at the merchant in operation 1006. The coupon may also be activated in response to a signal from the merchant 1012.

At operation 1014, a command from the user of the mobile device to use the coupon as part of purchase of a good or service is received. The command may be an explicit command to use the coupon or the command may be implicit in that the coupon is automatically applied when the purchase is transacted. The transaction may be a purchase of a good or service at the same merchant where the coupon was activated 1016 or the transaction may be with an online retailer 1018. The transaction with the online retailer 1018 may be completed by using the mobile device.

If the active coupon is redeemed at the merchant 1016, the active coupon may appear in the electronic document as a machine-readable code such as a barcode that can be presented to the point-of-sale device at the merchant. The active coupon may also be a code or pass phrase that the user can show or tell an employee of the merchant in order to receive the discount.

In implementations in which, the coupon is be activated at the merchant, but redeemable at an online retailer 1018. The mobile device may connect to a network from within the merchant to use the active coupon at an online retailer. The active coupon may remain active once activated even if the mobile device later leaves the merchant or, in other implementations, the active coupon may revert to an inactive coupon once the mobile device is no longer located at the merchant.

What is claimed is:

1. One or more non-transitory computer-readable storage media storing computer-executable instructions that, when executed by one or more processors, instruct one or more computer systems to perform operations facilitating communications over a data network with a mobile device of a user and a computing device of a merchant, the operations comprising:
   receiving an identifier of the user from the mobile device over the data network;
   identifying items of interest to the user based at least in part on the identifier and a user profile stored in a database;
   determining a geolocation of the mobile device based at least in part on a location sensor of the mobile device;
   identifying, based at least in part on a merchant profile stored in the database, that the merchant is within a proximity of the geolocation of the mobile device;
   comparing the items of interest to the user with items offered by the merchant based at least in part on the proximity and on the merchant profile stored in the database, the merchant profile storing identifiers of the items offered by the merchant;
   determining, based at least in part on an outcome of the comparing, a match indicating that the merchant offers a matching item, the matching item comprising at least one of the items of interest or an item related to the items of interest;
   authenticating the user based at least in part on a data handshake with the mobile device over the data network and authenticating the merchant based at least in part on a data handshake with a computing device of the merchant over the data network;
   transmitting match information that identifies the matching item and the geolocation of the mobile device to the computing device of the merchant, the match information transmitted over the data network based at least in part on the match, the proximity of the merchant to the geolocation of the mobile device, the user being authenticated, and the merchant being authenticated;
   receiving, over the data network, a bid from the computing device of the merchant in response to the match information being transmitted to the computing device of the merchant, the bid based at least in part on the matching item and the geolocation of the mobile device;
   generating, based at least in part on the bid, a notification to indicate the bid of the merchant and that the merchant offers the at least one of the items of interest or the item related to the items of interest; and
   transmitting, over the data network, the notification to the mobile device of the user, the transmitting activating the mobile device to present the notification.

2. The non-transitory computer-readable storage media as recited in claim 1, wherein the items of interest comprise at least one of a list of goods and/or services that the user has previously viewed, a wish list of goods and/or services associated with the user, a list of goods and/or services in a shopping cart associated with the user, or items identified in the user profile.

3. The non-transitory computer-readable storage media as recited in claim 1, the operations further comprising, in response to sending the notification to the computing device of the merchant, receiving a payment from the computing device of the merchant and, responsive to receiving the payment, sending the notification to the mobile device.

4. The non-transitory computer-readable storage media as recited in claim 1, the operations further comprising:
   transmitting the match information to an additional computing device of an additional merchant that is within the proximity of the geolocation of the mobile device and that offers the at least one of the items of interest or the item related to the items of interest;
   in response to sending the matching, receiving an additional bid from the additional computing device of the additional merchant;
   selecting the bid of the merchant based at least in part on a comparison of the bid and the additional bid; and
   including the bid in the notification based at least in part on the bid being selected.

5. A method comprising:
   receiving, by at least one of one or more computing devices and over a data network, an identifier from a mobile device;
   identifying, by at least one of the one or more computing devices, a user associated with the mobile device and items of interest to the user based at least in part on the identifier;
   receiving, by at least one of the one or more computing devices and over the data network, location data from the mobile device based at least in part on a location sensor of the mobile device;
   determining, by at least one of the one or more computing devices, a geolocation of the mobile device based at least in part on the location data;

identifying, by at least one of the one or more computing devices, a merchant within a proximity of the geolocation of the mobile device;

determining, by at least one of the one or more computing devices, a match indicating that the merchant offers at least one matching item to the items of interest to the user, the at least one matching item comprising at least one of the items of interest to the user or an item related to the items of interest to the user;

authenticating the user based at least in part on a data handshake with the mobile device over the data network and authenticating the merchant based at least in part on a data handshake with a computing device of the merchant over the data network;

transmitting, by at least one of the one or more computing devices to the computing device of the merchant, match information that identifies the at least one matching item and the geolocation of the mobile device, the match information transmitted over the data network based at least in part on the match, the proximity of the merchant to the geolocation of the mobile device, the user being authenticated, and the merchant being authenticated;

receiving, by at least one of the one or more computing devices from the computing device of the merchant, a response associated with offering the at least one matching item, the response received over the data network based at least in part on the at least one matching item and the geolocation of the mobile device; and transmitting, by at least one of the one or more computing devices over the data network, a notification to the mobile device of the user, the notification comprising the response and indicating that the merchant offers the at least one matching item, the transmitting activating the mobile device to present the notification.

6. The method as recited in claim 5, further comprising, prior to determining that the merchant offers the at least one matching item:

receiving, from the merchant, a current inventory of items available from the merchant; and comparing the items of interest to the user with the current inventory of items available from the merchant, and wherein determining that the merchant offers the at least one matching item is performed without revealing an identity of the user to the merchant.

7. The method as recited in claim 5, further comprising, prior to determining that the merchant offers the at least one matching item:

providing, to the merchant, the items of interest to the user; and receiving the response from the merchant that specifies whether the at least one matching item is available from the merchant.

8. The method as recited in claim 7, wherein the items of interest to the user are provided to the merchant in exchange for a payment or a payment commitment from the merchant such that the response includes the payment or the payment commitment from the merchant.

9. The method as recited in claim 8, wherein the payment or the payment commitment is contingent upon the user actually purchasing the at least one matching item.

10. The method as recited in claim 5, wherein the identifying the merchant comprises:

identifying a plurality of merchants that are located within the proximity of the geolocation of the mobile device and that offer the at least one matching item;

transmitting the match information to computing devices of the plurality of merchants;

receiving a plurality of responses from the computing devices based at least in part on the match information; and selecting the merchant based at least in part on a comparison of the response and the plurality of responses.

11. A system comprising:

one or more processors; and memory storing computer-executable instructions that, when executed by the one or more processors, configure the one or more processors to at least:

receive, over a data network, an identifier from a mobile device;

identify a user associated with the mobile device and items of interest to the user based at least in part on the identifier;

determine a geolocation of the mobile device based at least in part on a location sensor of the mobile device;

identify a merchant within a proximity of the geolocation of the mobile device;

determine a match indicating that the merchant offers at least one matching item to the items of interest to the user, the at least one matching item comprising at least one of the items of interest to the user or an item related to, or similar to, the items of interest to the user;

authenticate the user based at least in part on a data handshake with the mobile device over the data network and authenticating the merchant based at least in part on a data handshake with a computing device of the merchant over the data network;

transmit, to the computing device of the merchant, match information that identifies the at least one matching item and the geolocation of the mobile device, the match information transmitted over the data network based at least in part on the match, the proximity of the merchant to the geolocation of the mobile device, the user being authenticated, and the merchant being authenticated;

receive, over the data network, an offer for the at least one matching item from the computing device of the merchant, the offer received over the data network based at least in part on the at least one matching item and the geolocation of the mobile device; and transmit, over the data network, a notification to the mobile device of the user, the notification comprising the offer, the transmitting activating the mobile device to present the notification.

12. The system as recited in claim 11, wherein the identifying of the merchant comprises identifying a plurality of merchants within the proximity, the acts further comprising determining that a subset of the plurality of merchants each offer respective matching item, and wherein the notification comprises a list or a map of the subset of merchants.

13. The system as recited in claim 12, wherein the notification comprises instructions to present a location of the merchant on the map based at least in part on a proximity of the merchant to the geolocation of the mobile device and to identify an additional merchant of the plurality of merchants in the list based at least in part on a relative proximity of the additional merchant with respect to the proximity of the merchant.

14. The system as recited in claim 12, wherein the list or the map specifies a respective matching item associated with each merchant in the list or the map, and at least one of a respective price of the respective matching item or a respective coupon for the respective matching item.

15. The system as recited in claim 11, wherein the one or more processors are further configured to at least, prior to determining that the merchant offers the at least one matching item:
   receive, from the merchant, a current inventory of items available from the merchant; and
   compare the items of interest to the user with the current inventory of items available from the merchant,
   wherein determining that the merchant offers the at least one matching item is performed without revealing an identity of the user to the merchant.

16. The system as recited in claim 11, wherein the one or more processors are further configured to at least determine an online retailer that offers the at least one matching item, and wherein the notification comprises information about the online retailer.

17. The system as recited in claim 16, wherein the match information identifies the online retailer, and wherein the offer of the merchant is based at least in part on a communication between the merchant and the online retailer.

18. The system as recited in claim 11, wherein the instructions further configure the one or more processors to at least transmit the identifier of the mobile device to the computing device of the merchant and the geolocation of the mobile device and wherein transmitting the identifier of the mobile device enables the computing device of the merchant to contact the mobile device directly.

19. The one or more non-transitory computer-readable storage media of claim 1, wherein the match information is transmitted and the bid is received in real-time relative to the mobile device of the user being in proximity to the merchant, and wherein the bid is generated based at least in part on real-time availability of the at least one of the items of interest or the item related to the items of interest from the merchant relative to the mobile device of the user being in proximity to the merchant.

20. The or more non-transitory computer-readable storage media of claim 1, wherein the items of interest to the user are identified from a virtual cart of the user, wherein the virtual cart is stored in the user profile, wherein the match information transmitted to the merchant device identifies respective items in the virtual cart, and wherein the bid is based at least in part on the respective items.

* * * * *